United States Patent [19]

Bertozzi et al.

[11] 4,061,612
[45] Dec. 6, 1977

[54] LOW TEMPERATURE PLASTICIZERS FOR SPECIALTY RUBBERS CONSISTING OF DIESTERS OF DICARBOXYLIC ACIDS WITH HEXYLOXYETHOXYETHANOL OR BUTOXYETHOXYETHOXYETHANOL

[75] Inventors: Eugene R. Bertozzi, Yardley, Pa.; Robert F. Hoffman, Delran; Robert Barclay, Trenton, both of N.J.

[73] Assignee: Thiokol Corporation, Newtown, Pa.

[21] Appl. No.: 702,826

[22] Filed: July 6, 1976

[51] Int. Cl.² .......................... C08K 5/11; C08K 5/12; C07C 69/34
[52] U.S. Cl. .......................... 260/31.4 R; 260/31.8 R; 560/182
[58] Field of Search ......... 260/31.4 R, 485 P, 31.8 R, 260/31.8 C

[56] References Cited

U.S. PATENT DOCUMENTS

| | | | |
|---|---|---|---|
| 1,706,639 | 3/1929 | Van Schoock | 260/485 P |
| 2,897,169 | 7/1969 | Dozzi | 260/485 P |
| 3,398,201 | 8/1968 | Glickman | 260/485 P |
| 3,855,165 | 12/1974 | Aron | 260/31.4 R |
| 4,012,357 | 3/1977 | Foulks, Jr. et al. | 260/31.2 R |

*Primary Examiner*—Joseph L. Schofer
*Assistant Examiner*—Peter F. Kulkosky
*Attorney, Agent, or Firm*—Stanley A. Marcus; Royal E. Bright

[57] ABSTRACT

Diesters of succinic, glutaric, adipic, and phthalic acid with hexyloxyethoxyethanol or butoxyethoxyethoxyethanol are disclosed. They are useful as plasticizers with extended temperature ranges in elastomers.

17 Claims, No Drawings

LOW TEMPERATURE PLASTICIZERS FOR SPECIALTY RUBBERS CONSISTING OF DIESTERS OF DICARBOXYLIC ACIDS WITH HEXYLOXYETHOXYETHANOL OR BUTOXYETHOXYETHANOL

BACKGROUND OF THE INVENTION

The use of plasticizers to extend and soften rubber is an old and well-known technique. Many plasticizers have been used for improving the processing or lowering the cost of rubber compounds. Specialty rubbers, such as neoprene, nitriles, chlorinated and chlorosulfonated polyethylene, polyacrylates, polyurethanes, and polyepichlorohydrins, present a special problem when a suitable plasticizer is desired. A specialty rubber, which is normally more costly, is most often selected because of a desire for better high temperature performance, better solvent and/or oil resistance, and/or better ageing characteristics or physical properties. Incorporation of polar functions into the molecular structure of the rubber is responsible for the enhancement of the desired characteristics. While the presence of these polar functions tends to improve the hydrocarbon solvent resistance and/or the high temperature performance of a particular rubber, it also introduces undesirable effects on the low temperature properties by raising the glass transition temperature, and rendering the polymer brittle. To counteract this and improve the low temperature performance a plasticizer may be compounded with the rubber. As the plasticizer is an extractable and relatively volatile component of the mixture, its addition reduces the solvent resistance and high temperature performance of the rubber, but to obtain reasonable low temperature performance it has been necessary to compromise high temperature performance and solvent resistance.

Because of a growing need for high performance materials in mechanical applications evidenced by higher engine operating temperature for automobiles and machinery as well as use of fuels with increased solvent power, and the extension of areas of use into both the Arctic and Tropics, there has been a continual search for plasticizers which will broaden the working range of specialty rubbers.

Some of the parameters which have been suggested for use in matching a plasticizer and a rubber include, the solubility parameter, the hydrogen bonding effect, free volume of solvents, and the glass transition temperature. A number of statistical and thermodynamic theories have been proposed to account for the effects of a plasticizer in a rubber formulation. While these are useful in selecting particular categories of compounds as likely candidates, no compound can be predicted as particularly useful until it has been treated in actual formulations.

Among the variables of potential plasticizers it is known that polarity, aromaticity, and molecular weight are of importance. This is particularly true of polarity in the case of the specialty rubbers, which contain polar functions and require that a plasticizer have polarity so as to match the solubility parameter and hydrogen bonding effects. Among the more common polar groups used in plasticizers are halogens, nitriles, ethers, esters, and urethanes. Aromaticity is a factor as high aromaticity favors compatibility, in general lowers volatility but normally gives poorer low temperature properties. Molecular weight, of course, affects volatility but high molecular weight compounds in general show lowered compatibility and tend sometimes to bleed out of a particular system at elevated temperatures.

Although many varied plasticizers have been and are used in formulations with the specialty rubbers, desirable low temperature properties, resistance to extraction by solvents, and low volatility are not possessed, to the maximum desired extent, by any.

Di-(butoxyethoxyethanol)adipate is known as a plasticizer, and a polyether plasticizer derived from butoxyethoxyethanol and thiodiglycol is disclosed in U.S. Pat. No. 3,163,620. The present compounds are polyether esters of selected dibasic acis and they provide significantly better use properties.

SUMMARY OF THE INVENTION

The invention provides a composition of matter having the formula $$R\left[\overset{O}{\underset{\|}{C}}-O-(CH_2CH_2-O)_n-(CH_2)_m-CH_3\right]_2 \quad (I)$$

wherein R is —(CH$_2$)$_3$—, —(CH$_2$)$_4$—,

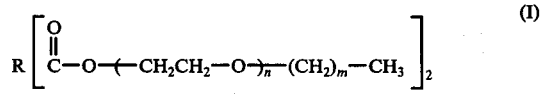

a mixture of —(CH$_2$)$_3$— and —(CH$_2$)$_4$—, or a mixture of —(CH$_2$)$_2$—, (CH$_2$)$_3$—, and —(CH$_2$)$_4$—; and n and m are 3, or n is 2 and m is 5.

The tangible embodiments of the principal composition aspect possess the inherent physical characteristics of being liquids, substantially volatile only at elevated temperatures, and reduced pressure, and being substantially insoluble in water.

The tangible embodiments of the principal composition aspect of the invention posses the inherent applied use characteristics of being plasticizers for elastomeric goods over an extended temperature range, as established by examination of actual elastomeric formulations by standard tests.

A preferred aspect of this composition aspect of the invention resides in the concept of a composition of matter of Formula I wherein R is —(CH$_2$)$_3$—. A particularly preferred aspect of this preferred aspect of the invention is the compound di-(butoxyethoxyethanol)-glutarate. Another preferred aspect of this composition aspect of the invention resides in the concept of a composition of matter of Formula I wherein R is —(CH$_2$)$_4$—. Another preferred aspect of this composition aspect of the invention resides in the concept of a composition of matter of Formula I wherein R is

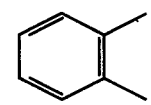

Another preferred aspect of this composition aspect of the invention resides in the concept of a composition of matter of Formula I wherein R is a mixture of —(CH$_2$)$_3$—, and —(CH$_2$)$_4$—; or —(CH$_2$)$_2$—, —(CH$_2$)$_3$— and —(CH$_2$)$_4$—.

The invention further provides the concept of an elastomeric composition having solvent resistance, high temperature stability and extended low temperature properties which comprises:

a. an effective amount of a composition of matter of Formula I; and
b. a specialty rubber.

The tangible embodiments of the second composition aspect of the invention possess the inherent applied use characteristic of being elastomers suitable for use where exposed to extreme ranges of high and low temperature conditions such as, in hose, gaskets and other elastomeric articles for "under the hood" use in automobiles where the temperatures may range from about −30° F to about 300° F or more.

The invention further provides in a process aspect, the concept of an improved process for the preparation of an elastomeric composition, containing a plasticizer, having solvent resistance, high temperature stability and extended low temperature properties which comprises: compounding a specialty rubber with a composition of matter of Formula I as the plasticizer.

DESCRIPTION OF THE PREFERRED EMBODIMENTS

The compositions of Formula I may be prepared by standard techniques well known to those in the art. Butoxyethoxyethoxyethanol, or hexyloxyethoxyethanol are reacted with the desired dibasic acid or with a suitable derivative such as an acid anhydride, acid halide, or an ester. The reaction is normally run at an elevated temperature either neat or in an inert solvent optionally in the presence of a catalyst. The product may be recovered by conventional methods. Typically, dimethyl glutarate and butoxyethoxyethoxyethanol are heated at reflux in the presence of a catalytic amount of dibutyl tin oxide for a short period of time and then the methanol and water formed during the reaction are gradually removed by distillation, conveniently while gradually reducing the pressure in the reaction vessel. Treatment with calcium oxide, decolorizing charcoal, distillation of excess starting butoxyethoxyethoxyethanol under vacuum and clarification by filtration is a convenient method of obtaining di-(butoxyethoxyethoxyethanol)glutarate of purity sufficient for use.

One skilled in the art of organic chemistry could of course, if desired, substitute the other alternative starting materials for the dimethyl glutarate and butoxyethoxyethoxyethanol illustrated and obtain the alternative embodiments of the compositions of matter of Formula I contemplated as part of the invention. It will similarly be obvious that instead of a starting material based on a single acid, that either mixed acids or a mixture of esters derived from mixed acids may be substituted in the reaction and that the product will then be a mixture of esters derived from a single alkoxy alkanol and the mixed acid starting material.

The starting materials for the practice of the invention are all commercially available. Hexyloxyethoxyethanol and butoxyethoxyethoxyethanol are marketed by Union Carbide Corp. under the tradenames Hexyl Carbitol and Butoxytriglycol respectively. Adipic, glutaric, and phthalic acids, and various alkanoic esters and anhydrides thereof are all staples of commerce. Mixture of dimethyl succinate, dimethyl glutarate and dimethyl adipate are marketed by the DuPont Co.

In using the compositions of Formula I they made be used in compounding elastomer formulations in conventional ways. If desired other conventional additives may be included in the formulations. The compounding may be with any specialty rubber which is desired for a particular application.

As used herein and in the appended claims the term specialty rubber means one of the elastomers normally selected by those skilled in the art when ability to resist high and low temperature while being substantially oil and solvent resistant are desired. Illustrative of these but without limitation thereto are such rubbers as, for example, neoprene, nitrile, Hypalon, polyacrylates, polyurethanes, polyepichlorohydrin, and polysulfides.

The following examples further illustrate the best mode contemplated by the inventors for the practice of their invention.

EXAMPLE 1

Di-(hexyloxyethoxyethanol)adipate

A mixture of adipic acid (526.1 g; 3.60 moles) and hexyloxyethoxyethanol (1712.5 g; 9.00 moles) was heated in a 5 liter three necked flask, equipped with a mechanical stirrer, a thermometer, an inlet for dry nitrogen gas, and a 12" Vigreux column with split-drop head. After 1.25 hours, the pot temperature was 167° C, and the mixture was boiling. Reaction was continued under total reflux for 32 minutes, the temperature falling to 146° C, after which distillate was collected for 4.7 hours, while the temperature rose to 263° C. The mixture was cooled and allowed to stand overnight, after which it was again heated for 3.1 hours. The final temperature was 272° C, and the total volume of distillate was 136 ml., including 128 ml. of an aqueous layer. The residue was stripped by heating to a final pot temperature of 212° C at 0.4 mm. pressure. The yield of the title product $n_D^{25}$ 1.4499, was 1645.3 g, (93.1%).

Analysis:

Acid No. 7.3
Hydroxyl No. (Corr.) 10
Water (%) 0.14

EXAMPLE 2

Di-(butyloxyethoxyethanol)-Glutarate

In an apparatus similar to that used for Example 1, were placed 640.7 g, (4.00 moles) of dimethyl glutarate, 2063 g, (10.00 moles) of butoxyethoxyethoxyethanol, and 2.84 g of dibutyltin oxide (0.05 wt. % tin metal, based on total reactant). The mixture was heated over an hour to 144° C, at which temperature it was boiling, then held under total reflux for 15 minutes, the temperature falling to 136° C. Heating under atmospheric pressure was continued for 2.5 hours; the temperature rose to 229° C, and 264 ml. of distillate (mostly methanol) was collected. Heating was continued under a partial vacuum for an additional 1.5 hours; the temperature rose to 249° C, while the pressure was reduced gradually to 189 mm. Distillate collected during this interval amounted to 60 ml. The mixture was cooled, calcium oxide (3.6 g) and activated carbon (Darco G-60; 40.7 g) were added, and the residue was freed of BTG by stripping in two stages, to a final pot temperature of 233° C at 0.9 mm. pressure. The mixture was cooled, a filter aid (Celite 545; 22 g) was added and it was filtered. The yield of title product $n_D^{25}$ 1.4506, was 1817.5 g (89.3%). The purity of this product by gas chromatography was 88.5%.

Analysis:

Acid No. 0.15
Hydroxyl No. (Corr) 3.8
Water (%) 0.29

EXAMPLE 3

Di-(hexyloxyethoxyethanol)-Phthalate

In a 3 liter three necked flask, equipped with a nitrogen inlet, a thermometer, a stirrer, and a Dean-Stark trap, connected to a reflux condenser, were placed 296.2 g (2.00 moles) of phthalic anhydride, 837.1 g (4.40 moles) of hexyloxyethoxyethanol, 8.4 g (0.044 moles) of toluenesulfonic acid monohydrate, and 260 ml. of toluene. This mixture was heated under reflux (pot temperature 145°–150° C) for 21.6 hours. About 38 ml. of water was collected in the trap, and the acid number of the residue was 3.7. To the cooled mixture was added 16.7 g of anhydrous $Na_2CO_3$; it was then heated at reflux for about 17 minutes, cooled to 60° C, and diluted with 350 ml. of water. After the aqueous phase had been removed, the organic solution was washed with five 500 ml. portions of deionized water. (Ethanol was used when necessary to aid in breaking an emulsion). Toluene was removed by heating to 152° C at 30 mm. pressure, and stripping was completed by heating to 218° C at 0.35 mm. The yield of title product was 945.6 g (92.6%).

Analysis:

Acid No. 0.07
Hydroxyl No. (Corr.) 2.9
Water (%) 0.09

If desired, this product may be stabilized by the addition of an antioxidant.

EXAMPLE 4

Di-(butoxyethoxyethanol)-Phthalate

In a 2 liter flask, equipped as described in Example 1, were placed 296.2 g (2.00 moles) of phthalic anhydride, 907.5 g (4.40 moles) of butoxyethoxyethanol and 1.05 g of stannous oxalate (0.05 wt. % Sn, based on total reactants). The mixture was heated over 43 minutes to the boiling point (222° C), heated under reflux at 222°–214° C for 5 minutes, heated under atmospheric pressure at 213°–230° C for 3.1 hours with removal of distillate, and distilled at pot temperature 206°–230° C for 1.6 hours while the pressure was gradually reduced to about 145 mm. At this point, 39.5 ml. of distillate had been removed, and the acid number was 4.2. Heating was continued for 5 hours at 212°–227° C and 130-131 mm. pressure; 20 ml. of distillate was collected, and the acid number fell to 0.30. The crude product was stripped to 199° C at 3.2 mm. pressure and cooled; after 21.7 g of Celite 545 had been added, it was filtered. The yield of title product was 1031.1 g (95.0%).

Analysis:

Acid No. 0.33
Hydroxyl No. (Corr.) 9.3
Water (%) 0.03

If desired, this product may be stabilized by the addition of an antioxidant.

EXAMPLE 5

Di-(hexyloxyethoxyethanol)-Adipate

In an apparatus similar to that used for Example 1, were placed 1903 g (10.00 moles) of hexyloxyethoxyethanol, 585 g (4.00 moles) of adipic acid, and 0.37 g of concentrated sulfuric acid. The mixture was heated over 1.1 hours to 141° C, at which point it was boiling, and then was held under reflux for 0.6 hours, the temperature falling to 128° C. Heating with removal of distillate (water) was continued for 5.9 hours to a pot temperature of 249° C; at this time the acid number was 9.2. Further heating for 5.3 hours at 222°–270° C reduced the acid number to 4.9. After 2.0 g of $Ca(OH)_2$ had been added, the mixture was stripped by heating to a pot temperature of 292° C at 1.2 mm. pressure.

The residue was cooled and filtered in the presence of a filter aid (Celite 535; 40 g). Analytical data refer to a sample decolorized by treatment with activated carbon, (Darco G-60). They yield of title product was 1724.3 g (87.8%), $n_D^{25}$ 1.4449.

Analysis

Acid No.: 3.1
Hydroxyl No. (Corr.) 6.0
Water (%) 0.08

EXAMPLE 6

Mixed Dibutoxyethoxyethanol Esters of Succinic, Adipic, and Glutaric Acids

Butoxyethoxyethanol (1897 g, 9.20 moles), a mixture of dimethyl succinate (24 wt. %), dimethyl glutarate (49 wt. %) and dimethyl adipate (27 wt. %) (643 g, 4.02 moles) and conc. sulfuric acid (0.2 ml) were heated, in an apparatus similar to that described for Example 1, over a period of 1.2 hours to a temperature of 167° C and held under reflux for 0.55 hours. During this period the pot temperature fell to 145° C. Distillate was then removed over a period of 5.75 hours, the temperature rising to 245° C. After cooling and adding $Ca(OH)_2$ (2.0 g), stripping was effected by heating to 255° C at 2.1 mm pressure. The residue was cooled, decolorized by heating for 2 hours at 90° in the presence of 40 g of Celite 535, 22 g of Super Cel and 20 g of Darco G-60 and filtering.

Analysis

Acid No.: 0.13
Hydroxyl No. (Corr.) 1.3
Water (%) 0.14

EXAMPLE 7

Di-(Hexyloxyethoxyethanol)-Glutarate

Following a procedure analogous to that described in Example 6 there is obtained from hexyloxyethoxyethanol, and dimethyl glutarate in the presence of a catalytic amount of sulfuric acid an 85.5% yield of the title product.

Analysis

Acid No.: 0.07
Hydroxyl No. (Corr.) 3.8
Water (%) 0.19

EXAMPLE 8

Di-(Butoxyethoxyethoxyethanol)-Glutarate

Following a procedure analogous to that described in Example 6 there is obtained from butoxyethoxyethoxyethanol, and dimethyl glutarate, in the presence of a catalytic amount of sulfuric acid, the title product.

Analysis
Acid No.: 0.37
Hydroxyl No. (Corr.) 3.5
Water (%) 0.10

EXAMPLE 9

Di-(Hexyloxyethoxyethanol)-Glutarate

Following a procedure analogous to that described in Example 2, there is obtained from hexyloxyethoxyethanol and dimethyl glutarate, in the presence of a catalytic amount of dibutyl tin oxide a 77% yield of the title product.

Analysis
Acid No.: 0.38
Hydroxyl No. (Corr.) 0.4
Water (%) 0.19

EXAMPLE 10

Mixed Dihexyloxyethoxyethanol Ester of Succinic, Glutaric and Adipic Acids

Following a procedure analogous to that described in Example 2, there is obtained from hexyloxyethoxyethanol, and a mixture of the dimethyl esters of succinic acid (0-3 wt. %), glutaric acid (62-68 wt. %), and adipic acid (31-37 wt. %), in the presence of a catalytic amount of dibutyl tin oxide, 89.5% of the title product.

Analysis
Acid No.: 0.11
Hydroxyl No. (Corr.) 2.4
Water (%) 0.12

EXAMPLE 11

Mixed Di-butoxyethoxyethoxyethanol Esters of Dialkanoic Acids

Following a procedure analogous to that described in Example 2, there is obtained from butoxyethoxyethoxyethanol, and the dimethyl esters of succinic acid (0-3 wt. %), glutaric acid (62-68 wt. %), and adipic acid (31-37 wt. %), in the presence of a catalytic amount of dibutyl tin oxide, there is obtained 92% of the title product.

Analysis
Acid No.: 0.35
Hydroxyl No. (Corr.) 6.5
Water (%) 0.23

EXAMPLE 12

Di-(Butoxyethoxyethoxyethanol)-Phthalate

Following a procedure analogous to that described for Example 3, there is obtained from butoxyethoxyethoxyethanol, and phthalic anhydride, in the presence of a catalytic amount of para toluene sulfonic acid monohydrate, on 86% yield of the title product.

Analysis
Acid No.: 0.05
Hydroxyl No. (Corr.) 2.7
Water (%) 0.09

EXAMPLE 13

Elastomer formulations were compounded in the formulations shown. Test properties found after cure and after ageing are shown in the tables following:

| Formulations | Parts |
|---|---|
| 1. Neoprene WRT (duPont) | 100 |
| Semi-Reinforcing Furnace (SRF)#3, Carbon Black | 60 |
| Zinc Oxide | 5 |
| Extra Light Calcined Magnesia | 4 |
| Stearic Acid | 0.5 |
| 2-Mercaptoimidazoline | 0.5 |
| Plasticizer | 30 |
| 2. Hycar 1051* | 100 |
| SRF#3 Carbon Black | 60 |
| Zinc Oxide | 5 |
| Sulfur | 1.75 |
| Benzothiozyldisulfide | 1.5 |
| Symmetric Diphenylguanidine | 0.25 |
| Plasticizer | 30 |
| 3. Polyacrylate Rubber (ethyl acrylate, allylglycidyl ether; 95-5-0.1) | 100 |
| Fast Extrusion Furnace Carbon Black | 60 |
| Zinc Dimethyldithiocarbamate | 2 |
| Phenyl- -naphthylamine | 1.5 |
| Stearic Acid | 1 |
| Plasticizer | 30 |
| 4. Hydrin 200 (epichlorohydrin copolymer with ethylene oxide) (B. F. Goodrich) | 100 |
| Fast Extrusion Furnace Carbon Black | 30 |
| Red Lead | 5 |
| 2-Mercaptoimidazoline | 1.5 |
| TE-75 (Internal Lubricant) (Tech. Proc. Inc., Patterson, N.J.) | 1.5 |
| Nickeldithiodibutylcarbamate | 1 |
| Plasticizer | 30 |
| 5. Toluene diisocyanate-polylactone polyol rubber based on caprolactone, M.W. polyactone polyol=1250) or Toluene diisocyanate-ethylene propylene polyadipate rubber (M.W. polyadipate=2700) | 100 |
| Super Abrasion Furnance Carbon Black | 60 |
| Benzothiazyldisulfide | 4 |
| Mercaptobenzoylthiazole | 2 |
| Sulfur | 1.5 |
| Partial complex of ZnCl$_2$ with benzothiazyldisulfide (duPont) | 1 |
| TE-75 | 1 |
| Cadmium Stearate | 0.5 |
| Plasticizer | 30 |

*HYCAR 1051 (B. F. Goodrich) is a high-nitrile rubber (nominal acrylonitrile content about 41%).

TABLE I

| | Evaluation of Plasticizers Compounded 30 phr in Neoprene WRT | | | | | | | |
|---|---|---|---|---|---|---|---|---|
| | Control (No Plasticizer) 70 hrs. H. Aging | | | | Butoxyethoxyethanol Formal 70 hrs. H. Aging | | | |
| Physical Prop. | Orig. Prop. | 212° F | 225° F | 250° F | Orig. Prop. | 212° F | 225° F | 250° F |
| Tensile, psi | 3000 | 2900 | 2830 | 1460 | 1660 | 2050 | 2160 | 1970 |
| Elong. % | 200 | 190 | 200 | 90 | 290 | 300 | 280 | 120 |
| 100% Mod. | 1150 | 1400 | 1350 | — | 350 | 420 | 500 | 1570 |
| 200% Mod. | 2870 | — | — | — | d 900 | 1070 | 1300 | — |
| Shore A | 82 | 82 | 82 | 88 | 60 | 65 | 70 | 88 |
| Wt. % Loss[1] | — | 0 | 0 | 0.13 | — | 6 | 9. | 14 |

TABLE I-continued

Evaluation of Plasticizers Compounded

|  |  |  |  |  |  | 39% | 61% | 95% |
|---|---|---|---|---|---|---|---|---|
| % Plast. Loss[2] | — | — | — | — | — | | | |
| $G_{10,000}$ | −39° F | −28° F | −28° F | −23° F | −71° F | −63° F | −55° F | −25° F |
| Compatibility | — | | | | OK | | | |
|  | Di-(Hexyloxyethoxyethanol)-Adipate | | | | Di:(Butoxyethoxyethoxyethanol)-Glutarate | | | |
| Tensile, psi | 2100 | 1990 | 1750 | 1290 | 2060 | 1950 | 1830 | 1370 |
| Elong., % | 280 | 270 | 250 | 90 | 280 | 250 | 250 | 90 |
| 100% Mod. | 460 | 450 | 450 | — | 420 | 450 | 470 | — |
| 200% Mod. | 1360 | 1350 | 1260 | — | 1250 | 1450 | 1375 | — |
| Shore A | 63 | 65 | 66 | 83 | 60 | 63 | 68 | 87 |
| Wt. % Loss | — | 1 | 1 | 6 | — | 2 | 2 | 7 |
| % Plast. Loss | — | 8% | 8% | 28% | — | 11% | 15% | 4 % ? |
| $G_{10,000}$ | −63° F | −61° F | −59° F | −34° F | −59° F | −58° F | −49° F | —%? |
| Compatibility | OK | | | | OK | | | |

[1] Based on total wt. of cured compound.
[2] Based on plasticizer present in formulation.

TABLE II

Evaluation of Plasticizers Compounded at 30 phr in Hycar 1051

| | Control (No Plasticizer) | | | | Butoxyethoxyethanol Formal | | | | Di-(Hexyloxyethoxyethanol)-Adipate | | | |
|---|---|---|---|---|---|---|---|---|---|---|---|---|
| | | 70 hrs. H. Aging | | | | 70 hrs. H. Aging | | | | 70 hrs. H. Aging | | |
| Physical Prop. | Orig. Prop. | 212 °F | 225 °F | 250 °F | Orig. Prop. | 212 °F | 225 °F | 250 °F | Orig. Prop. | 212 °F | 225 °F | 250 °F |
| Tensile, psi | 2810 | 3000 | 2710 | 2570 | 2160 | 2375 | 2610 | 2700 | 2180 | 2170 | 2060 | 2120 |
| Elong., % | 270 | 220 | 190 | 170 | 470 | 340 | 300 | 230 | 500 | 330 | 260 | 225 |
| 100% Mod. | 850 | 1125 | 1250 | 1530 | 350 | 510 | 780 | 1070 | 270 | 450 | 570 | 770 |
| 200% Mod. | 2250 | 2750 | — | — | 850 | 1350 | 1750 | 2400 | 645 | 1200 | 1550 | 2000 |
| 300% Mod. | — | — | — | — | 1410 | 2150 | 2610 | — | 1200 | 1950 | — | — |
| Shore A | 79 | 81 | 82 | 83 | 59 | 68 | 80 | 83 | 58 | 63 | 66 | 72 |
| Wt. % Loss[1] | — | .54 | .23 | .88 | — | 10 | 13.5 | 15 | — | 1.2 | 1.2 | NA |
| % Plast. Loss[2] | — | — | — | — | — | 61% | 74% | 95% | — | 8% | 8% | 9% |
| $G_{10,000}$ | +9° F | +13° F | +12° F | +15° F | −44° F | −6° F | +3° F | +14° F | −46° F | −41° F | −33° F | |
| Compatibility | — | | | | OK | | | | OK | | | |

| | Di-(Butoxxyethoxyethoxyetthanol)-Glutarate | | | | | | | | Di-(Butoxyethoxyethoxyethanol)-Mixed Esters (From Example 6) | | | |
|---|---|---|---|---|---|---|---|---|---|---|---|---|
| Tensile, psi | 2075 | 1960 | 2190 | 2000 | | | | | 1975 | 2140 | 1990 | 1800 |
| Elong., % | 490 | 310 | 300 | 200 | | | | | 470 | 340 | 270 | 200 |
| 100% Mod. | 290 | 450 | 540 | 825 | | | | | 275 | 390 | 510 | 740 |
| 200% Mod. | 700 | 1170 | 1450 | 1970 | | | | | 680 | 1060 | 1375 | 1800 |
| 300% Mod. | 1260 | 1880 | — | — | | | | | 1250 | 1850 | — | — |
| Shore A | 58 | 63 | 65 | 69 | | | | | 58 | 63 | 67 | 70 |
| Wt. % Loss | — | 1.3 | 1.5 | NA | | | | | — | 1.5 | 1.5 | NA |
| % Plast. Loss | — | 9% | 10% | 15% | | | | | — | 10% | 10% | 15% |
| $G_{10,000}$ | −49° F | −45° F | −45° F | −37° F | | | | | −49° F | −44° F | −44° F | −35° F |
| Compatibility | OK | | | | | | | | OK | | | |

[1] Based on total wt. of cured compound.
[2] Based on plasticizer present in cured formulation.

TABLE III

Evaluation of Plasticizers Compounded at 30 phr in Hydrin 200

| | Control (No Plasticizer) | | | | Butoxyethoxyethanol Formal | | | |
|---|---|---|---|---|---|---|---|---|
| | | 70 Hrs. H. Aging | | | | 70 Hrs. H. Aging | | |
| Physical Prop. | Orig. Prop. | 212 °F | 225 °F | 250 °F | Orig. Prop. | 212 °F | 225 °F | 250 °F |
| Tensile, psi | 1895 | 2125 | 2350 | 2050 | 1200 | 1200 | 1475 | 1860 |
| Elong., % | 380 | 330 | 350 | 300 | 505 | 380 | 420 | 440 |
| 100% Mod. | 475 | 500 | 500 | 480 | 210 | 220 | 250 | 310 |
| 200% Mod. | 1045 | 1230 | 1210 | 1200 | 440 | 510 | 560 | 625 |
| 300% Mod. | 1625 | 1975 | 2010 | — | 720 | 925 | 1000 | 1125 |
| Shore A | 66 | 68 | 67 | 67 | 47 | 52 | 57 | 62 |
| Wt. % Loss[1] | — | NA | 0.27 | 0.35 | — | 8 | 12.5 | 17.5 |
| % Plast. Loss[2] | — | — | — | — | — | 44% | 69% | 97% |
| $G_{10,000}$ | Not available | | | | Not available | | | |
| Compatibility | — | | | | | | | OK |

| | Di-(Hexyloxyethoxyethanol)-Adipate | | | | Di(Butoxyethoxyethoxyethanol)-Glutarate | | | |
|---|---|---|---|---|---|---|---|---|
| Tensile, psi | 1040 | 1373 | 1270 | 1295 | 1060 | 1425 | 1370 | 1310 |
| Elong., % | 410 | 510 | 460 | 500 | 440 | 480 | 470 | 460 |
| 100% Mod. | 175 | 200 | 195 | 170 | 195 | 225 | 200 | 195 |
| 200% Mod. | 390 | 425 | 420 | 390 | 445 | 500 | 470 | 440 |
| 300% Mod. | 652 | 725 | 745 | 670 | 725 | 840 | 825 | 780 |
| Shore A | 48 | 50 | 50 | 49 | 46 | 49 | 50 | 51 |
| Wt. % Loss | — | 2 | 2.3 | 2.6 | — | 2.3 | 3.4 | 4 |
| % Plast. Loss | — | 10% | 12% | 13% | — | 13% | 18% | 21% |
| $G_{10,000}$ | Not available | | | | Not available | | | |
| Compatibility | OK | | | | OK | | | |

| | Di-(Butoxyethoxyethoxyethanol) mixed ester (from Example 6) | | | |
|---|---|---|---|---|
| | | 70 Hrs. H. Aging | | |
| Physical Prop. | Orig. Prop. | 212 F | 225 °F | 250 °F |

TABLE III-continued

| Evaluation of Plasticizers Compounded at 30 phr in Hydrin 200 | | | | |
|---|---|---|---|---|
| Tensile, psi | 1175 | 1245 | 1240 | 1100 |
| Elong., % | 430 | 420 | 405 | 390 |
| 100% Mod. | 180 | 205 | 200 | 200 |
| 200% Mod. | 425 | 500 | 470 | 450 |
| 300% Mod. | 725 | 875 | 860 | 810 |
| Shore A | 48 | 49 | 49 | 51 |
| Wt. % Loss | — | 2.6 | 3.6 | 4 |
| % Plast. Loss | — | 15% | 19% | 21% |
| $G_{10,000}$ | Not available | | | |
| Compatibility | | | | OK |

(1)Based on total wt. of cured compound.
(2)Based on plasticizer present in cured formulation.

TABLE IV

| Heat Aging Evaluation, 70 hrs/300° F in Hydrin 200 | | | | | | | | |
|---|---|---|---|---|---|---|---|---|
| | Control | Adipate | Di-(Hexyloxyethoxyethanol) -Glutarate | | Di-(Butoxyethoxyethanol)- Example 6 | | Di-(Butoxyethoxyethoxy- ethanol)-mixed ester from | |
| | Orig. Prop. | Oven Aged | Orig. Prop. | Oven Aged | Orig. Prop. | Oven Aged | Orig. Prop. | Oven Aged |
| Tensile, psi | 1895 | 1610 | 1040 | 786 | 1060 | 890 | 1175 | 830 |
| Elong., % | 380 | 270 | 410 | 400 | 440 | 405 | 430 | 390 |
| 100% Mod. | 475 | 450 | 175 | 145 | 195 | 150 | 180 | 141 |
| 200% Mod. | 1045 | 1100 | 390 | 300 | 445 | 328 | 425 | 315 |
| 300% Mod. | 1625 | — | 625 | 545 | 725 | 600 | 725 | 580 |
| Shore A | 66 | 63 | 48 | 45 | 46 | 43 | 48 | 45 |
| Wt. % Loss | — | 2.5 | — | 7 | — | 7 | — | 6 |
| % Plast. Loss | — | — | — | 27.5% | — | 27% | — | 22% |
| $G_{10,000}$ | | | | | | Not available | | |

TABLE V

| Evaluation of Plasticizers Compounded at 30 phr in Polyacrylate Rubber | | | | | | | | | | | | | |
|---|---|---|---|---|---|---|---|---|---|---|---|---|---|
| | Control (No Plasticizer) | | | | Di-(Butoxyethoxyethanol) Adipate | | | | Di-(Hexyloxyethoxyethanol)- Adipate | | | | |
| F-671-49WP | | 70 Hrs. H. Aging | | | | 70 Hrs. H. Aging | | | | 70 Hrs. H. Aging | | | |
| Physical Prop. | Orig. Prop. | 212 °F | 225 °F | 250 °F | Orig. Prop. | 212 °F | 225 °F | 250 °F | Orig. Prop. | 212 °F | 225 °F | 250 °F | |
| Tensile, psi | 1850 | 1700 | 1690 | 1750 | 1150 | 1150 | 1190 | 1170 | 1150 | 1150 | 1090 | 1125 | |
| Elong., % | 240 | 240 | 250 | 250 | 380 | 360 | 380 | 360 | 430 | 410 | 440 | 420 | |
| 100% Mod. | 720 | 575 | 520 | 530 | 250 | 230 | 220 | 250 | 230 | 220 | 220 | 200 | |
| 200% Mod. | 1700 | 1475 | 1475 | 1525 | 645 | 650 | 650 | 670 | 600 | 580 | 590 | 575 | |
| 300% Mod. | — | — | — | — | 975 | 1000 | 1010 | 1040 | 925 | 930 | 910 | 950 | |
| Shore A | 73 | 73 | 72 | 72 | 53 | 53 | 52 | 55 | 52 | 51 | 52 | 52 | |
| Tempering, Wt. % Loss | .38% | — | — | — | 3.5% | — | — | — | 2% | — | — | — | |
| % Plast. Loss | — | — | — | — | 20% | — | — | — | 9% | — | — | — | |
| Wt. % Loss | — | — | — | — | — | 4 | 4.4 | 5 | — | 2.7 | N.A. | 2.3 | |
| % Plast. Loss | — | — | — | — | — | 2.4% | 26% | 28.5% | — | 15% | N.A. | 12% | |
| $G_{10,000}$ | | Not available | | | | Not available | | | | Not available | | | |
| | Di-(Butoxyethoxyethoxy- ethanol)-Glutarate | | | | Di-(Butoxyethoxyethoxyethanol)- mixed ester from Example 6 | | | | | | | | |
| Tensile, psi | 1150 | 1150 | 1150 | 1150 | 1150 | 1200 | 1200 | 1150 | | | | | |
| Elong., % | 390 | 390 | 390 | 390 | 370 | 390 | 420 | 370 | | | | | |
| 100% Mod. | 210 | 200 | 190 | 200 | 210 | 225 | 180 | 210 | | | | | |
| 200% Mod. | 600 | 600 | 560 | 590 | 575 | 645 | 560 | 600 | | | | | |
| 300% Mod. | 960 | 950 | 940 | 970 | 925 | 1010 | 950 | 1000 | | | | | |
| Shore A | 53 | 53 | 48 | 52 | 50 | 49 | 50 | 50 | | | | | |
| Tempering, Wt. % Loss | 2% | — | — | — | 2% | — | — | — | | | | | |
| % Plast. Loss | 10% | — | — | — | 10.5% | — | — | — | | | | | |
| Wt. % Loss | — | 2.5 | 3 | 2.6 | — | 2.5 | 3 | 3 | | | | | |
| % Plast. Loss | — | 14% | 15 | 14% | — | 13% | 15 | 16% | | | | | |
| $G_{10,000}$ | | Not available | | | | Not available | | | | | | | |

TABLE VI

| Evaluation of Plasticizers Compounded at 30 phr in Toluene diisocyanate-ethylenepropylene Polyadipate Rubber | | | | | | | | | | | | | |
|---|---|---|---|---|---|---|---|---|---|---|---|---|---|
| | Control (No Plasticizer) | | | | Di-(Butoxyethoxyethanol)- Adipate | | | | Di(Hexyloxyethoxyethanol)- Adipate | | | | |
| F-671-38-WP | | 70 hrs. H. Aging | | | | 70 hrs. H. Aging | | | | 70 hrs. H. Aging | | | |
| Physical Prop. | Orig. Prop. | 212 °F | 225 °F | 250 °F | Orig. Prop. | 212 °F | 225 °F | 250 °F | Orig. Prop. | 212 °F | 225 °F | 250 °F | |
| Tensile, psi | 4175 | 4200 | 4690 | 4000 | 2360 | 2500 | 2190 | 1800 | 2850 | 3060 | 2850 | 1930 | |
| Elong., % | 300 | 190 | 190 | 170 | 360 | 240 | 190 | 170 | 360 | 280 | 240 | 190 | |
| 100% Mod. | 1650 | 2250 | 2730 | 2650 | 510 | 875 | 1000 | 980 | 650 | 900 | — | — | |
| 200% Mod. | 3500 | — | — | — | 1200 | 2100 | — | — | 1575 | 2220 | — | — | |
| 300% Mod. | 4160 | — | — | — | 2000 | — | — | — | 2450 | — | — | — | |
| Shore A | 93 | 95 | 97 | 96 | 73 | 85 | 84 | 85 | 75 | 84 | 85 | 84 | |
| Wt. % Loss(1) | — | 1.5 | 2 | 2 | — | 3 | 3.0 | 5 | — | 1.5 | 2 | 2.4 | |
| % Plast. Loss(2) | — | — | — | — | — | 18% | 20% | 27% | — | 9% | 13% | 14% | |
| $G_{10,000}$ | — | −4° F | Not available | | −49° F | Not available | | | −48° F | Not available | | | |
| Compatibility | — | — | — | — | — | OK | — | — | — | OK | — | — | |

TABLE VI—Continued

Evaluation of Plasticizers Compounded at 30 phr in Toluene diisocyanate-ethylenepropylene Polyadipate Rubber

|  | Di-(Butoxyethoxyethoxyethanol)-Glutarate | | | | Di-(Butoxyethoxyethoxyethanol)-mixed ester from Example 6 | | | |
|---|---|---|---|---|---|---|---|---|
| Tensile, psi | 2600 | 2595 | 2350 | 1700 | 2770 | 2710 | 2590 | 1910 |
| Elong., % | 340 | 230 | 190 | 160 | 350 | 250 | 205 | 180 |
| 100% Mod. | 600 | 910 | 1000 | 950 | 650 | 900 | 1050 | 1000 |
| 200% Mod. | 1500 | 2250 | — | — | 1510 | 2210 | 2480 | — |
| 300% Mod. | 2360 | — | — | — | 2410 | — | — | — |
| Shore A | 73 | 84 | 84 | 84 | 77 | 84 | 84 | 84 |
| Wt. % Loss | — | 1.8 | 2.3 | 3 | — | 1.5 | 2 | 3 |
| % Plast. Loss | — | 10% | 13% | 16% | — | 9% | 13% | 15% |
| $G_{10,000}$ | −48° F | Not available | | | −47° F | Not available | | |
| Compatibility | OK | | | | OK | | | |

(1) Based on total wt. of cured compound.
(2) Based on plasticizer present in cured formulation.

EXAMPLE 14

Elastomers are compounded according to the following formulations. The properties after cure and after heat ageing are shown in the following tables:

Formulations:
1. Neoprene WRT a. Standard Recipe                                                     Parts
        Neoprene WRT                                                        100
        SRF #3 Carbon Black                                                  60
        Zinc Oxide                                                            5
        Extra Light Calcined Magnesia                                         4
        Stearic Acid                                                        0.5
        2-Mercaptoimidazoline                                               0.5
        Plasticizer                                                          30
    b. High Temperature Formulation
        Neoprene WRT                                                        100
        SRF #3 Carbon Black                                                  58
        Zinc Oxide                                                           10
        Extra Light Calcined Magnesia                                         4
        Stearic Acid                                                        0.5
        2-Mercaptoimidazoline                                              0.75
        p(p-toluenesulfonamido)-diphenylamine                                 1
        Octylated Diphenylamine                                               4
        Plasticizer                                                          30
2. Hycar 1051
        Hycar 1051                                                          100
        SRF #3 Carbon Black                                                f 60
        Zinc Oxide                                                            5
        Sulfur                                                             1.75
        Benzothiazyldisulfide                                               1.5
        Sym-Diphenylguanidine                                              0.25
        Plasticizer                                                          30
3. Toluene diisocyanate-polylactone polyl rubber (M. W.                    100
   polyactone polyol = 1250) or
   Toluene diisocyanated-ethylenepropylene adipate rubber                  100
   (M. W. polyadipated-2700)
        Super Abrasion Furnace Carbon Black                                  60
        Benzothiazyldisulfide                                                 4
        Mercaptobenzoylthiazole                                               2
        Sulfur                                                              1.5
        Partial complex of ZnCl$_2$ with benzothiazyldisulfide (duPont)       1
        TE-75                                                                 1
        Cadmium Stearate                                                    0.5
        Plasticizer                                                          30

TABLE VII

Evaluation of Plasticizers in Neoprene WRT-High Temperature Recipe

|  | Butoxyethoxyethanol Formal | | Di-(Butoxyethoxyethanol)-Glutarate | | Di-(Hexyloxyethoxyethanol)-Glutarate | |
|---|---|---|---|---|---|---|
|  | 70 hrs. H. Aging | | 70 hrs. H. Aging | | 70 hrs. H. Aging | |
| Physical Properties | Orig. Prop. | 250 °F | Orig. Prop. | 250 °F | Orig. Prop. | 250 °F |
| Tensile, psi | 1590 | 1890 | 1900 | 1950 | 2025 | 2030 |
| Elong., % | 240 | 160 | 260 | 240 | 330 | 290 |
| 100% Mod. | 500 | 1320 | 500 | 690 | 325 | 510 |
| 200% Mod. | 1300 | — | 1380 | 1610 | 875 | 1230 |
| Shore A | 66 | 92 | 66 | 76 | 58 | 59 |
| Wt. % Loss | X | 14.4 | X | 4 | X | 3.7 |
| % Plast. Loss | X | 100% | X | 28% | X | 18% |
| Low Temp. | −68° F | −26° F | −61° F | −51° F | 66° F | −52° F |
| % Perm. Set | 1 | 1 | 0 | 1 | 1 | 2 |

TABLE VIII

Evaluation of Plasticizers in Neoprene WRT-Standard Recipe

| Physical Properties | Butoxyethoxyethanol Formal | | | | Di-(Butoxyethoxyethanol)-Glutarate | | | | Di-Hexyloxyethoxyethanol)-Glutarate | | | |
|---|---|---|---|---|---|---|---|---|---|---|---|---|
| | Orig. Prop. | 70 Hrs. H. Aging | | | Orig. Prop. | 70 Hrs. H. Aging | | | Orig. Prop. | 70 Hrs. H. Aging | | |
| | | 212° F | 225° F | 250° F | | 212° F | 225° F | 250° F | | 212° F | 225° F | 250° F |
| Tensile, psi | 1940 | 1960 | 2120 | 1940 | 1950 | 1910 | 1670 | 1200 | 2010 | 1840 | 1670 | 1330 |
| Elong., % | 295 | 250 | 260 | 55 | 280 | 270 | 230 | 40 | 310 | 320 | 300 | 100 |
| 100% Mod. | 370 | 510 | 680 | — | 380 | 450 | 540 | — | 350 | 350 | 370 | — |
| 200% Mod. | 995 | 1420 | 1650 | — | 1100 | 1175 | 1430 | — | 950 | 940 | 990 | — |
| Shore A | 59 | 71 | 77 | 93 | 58 | 65 | 67 | 92 | 58 | 60 | 60 | 82 |
| Wt. % Loss | — | 9 | 11 | 14.5 | — | 2.7 | 3.5 | 7 | — | 1.5 | 1.8 | 6 |
| % Plast. Loss | — | 60% | 72% | 97% | — | 18% | 23% | 48% | — | 10% | 12% | 38% |
| $G_{10,000(LTT)}$ | −68°F | −56°F | NA | −18°F | −65°F | −61°F | −52°F | −20°F | −67°F | −63°F | −58°F | −°F |

TABLE IX

Evaluation of New Plasticizers in Hycar 1051

| Physical Properties | Butoxyethoxyethanol Formal | | | | Di-(Butoxyethoxyethanol)-Glutarate | | | | Di-(Hexyloxyethoxyethanol)-Glutarate | | | |
|---|---|---|---|---|---|---|---|---|---|---|---|---|
| | Orig. Prop. | 70 Hrs. H. Aging | | | Orig. Prop. | 70 Hrs. H. Aging | | | Orig. Prop. | 70 Hrs. H. Aging | | |
| | | 212° F | 225° F | 250° F | | 212° F | 225° F | 250° F | | 212° F | 225° F | 250° F |
| Tensile, psi | 2175 | 2600 | 2720 | 2800 | 2325 | 2250 | 2390 | 2210 | 2280 | 2360 | 2370 | 2400 |
| Elong., % | 470 | 350 | 305 | 210 | 470 | 330 | 305 | 240 | 480 | 370 | 310 | 280 |
| 100% Mod. | 390 | 560 | 800 | 1300 | 390 | 490 | 600 | 690 | 380 | 500 | 595 | 675 |
| 200% Mod. | 890 | 1400 | 1800 | 2600 | 890 | 1225 | 1470 | 1790 | 975 | 1250 | 1540 | 1810 |
| Shore A | 62 | 72 | 77 | 87 | 62 | 68 | 69 | 73 | 62 | 65 | 66 | 70 |
| Wt. % Loss | — | 8.6 | 13 | 15 | — | 2 | 2.5 | 3.5 | — | 1.1 | 1.4 | 2 |
| % Plast. Loss | — | 57% | 84% | 100% | — | 13% | 13% | 23% | — | 7% | 9% | — |
| $G_{10,000(LTT)}$ | −41°F | −19°F | 0° F | +15°F | 38°F | NA | −27°F | −26°F | −37° F | 30°F | −30°F | −23°F |

TABLE X

Evaluation of Plasticizers in Hycar 1051 at 300 PHR

| Physical Properties | Di-(Butoxyethoxyethanol)-Glutorate | | | | Di-(Butoxyethoxyethoxyethanol)-Glutarate-Ex.-2 | | | | Di-(Butoxyethoxyethoxyethanol)-Glutarate-Ex. 8 | | | |
|---|---|---|---|---|---|---|---|---|---|---|---|---|
| | Orig. Prop. | 70 Hrs. H. Aging | | | Orig. Prop. | 70 Hrs. H. Aging | | | Orig. Prop. | 70 Hrs. H. Aging | | |
| | | 212° F | 225° F | 250° F | | 212° F | 225° F | 250° F | | 212° F | 225° F | 250° F |
| Tensile, psi | 2300 | 2400 | 2130 | 2400 | 2300 | 2400 | 2130 | 2400 | 2300 | 2300 | 2210 | 2350 |
| Elong., % | 480 | 325 | 280 | 230 | 480 | 325 | 280 | 230 | 505 | 330 | 290 | 230 |
| 100% Mod. | 370 | 510 | 620 | 810 | 370 | 510 | 620 | 810 | 350 | 560 | 580 | 775 |
| 200% Mod. | 875 | 1440 | 1680 | 2070 | 875 | 1440 | 1680 | 2070 | 830 | 1410 | 1390 | 1920 |
| Shore A | 60 | 67 | 68 | 70 | 60 | 67 | 68 | 74 | 58 | 68 | 66 | 3 |
| Wt. % Loss | — | 2 | 2.5 | 3.5 | — | 2 | 2.5 | 3.5 | — | 1.7 | 2 | 21% |
| % Plast. Loss | — | 13% | 17% | 23% | — | 13% | 17% | 23% | — | 11% | 14% | −23°F |
| $G_{10,000(LTT)}$ | −32°F | −29°F | 24°F | −22°F | −32°F | −29°F | −24°F | −22°F | −33°F | −29°F | −27°F | |

TABLE XI

Evaluation of Plasticizer in Neoprene WRT* at 300 PHR

| Physical Properties | Di-(Butoxyethoxyethanol)=Glutarate | | | | Di-(Butoxyethoxyethoxyethanol)-Glutarate-Ex. 2 | | | | Di-(Butoxyethoxyethoxyethanol)-Glutarate-Ex. 8 | | | |
|---|---|---|---|---|---|---|---|---|---|---|---|---|
| | Orig. Prop. | 70 Hrs. H. Aging | | | Orig. Prop. | 70 Hrs. H. Aging | | | Orig. Prop. | 70 Hrs. H. Aging | | |
| | | 212° F | 225° F | 250° F | | 212° F | 225° F | 250° F | | 212° F | 225° F | 250° F |
| Tensile, psi | 1950 | 1910 | 1670 | 1200 | 1810 | 1590 | 1570 | 900 | 2060 | 1770 | 1810 | 1040 |
| Elong., % | 280 | 270 | 230 | 40 | 265 | 250 | 220 | 45 | 285 | 270 | 280 | 55 |
| 100% Mod. | 380 | 450 | 540 | — | 360 | 400 | 500 | — | 350 | 380 | 440 | — |
| 200% Mod. | 1100 | 1175 | 1430 | — | 1080 | 1100 | 1390 | — | 1100 | 1100 | 1310 | — |
| Shore A | 58 | 65 | 67 | 92 | 57 | 61 | 63 | 87 | 58 | 62 | 63 | 88 |
| Wt. % Loss | — | 2.7 | 3.5 | 7 | — | 2.2 | 3.1 | 7 | — | 2 | 3 | 6 |
| % Plast. Loss | — | 18% | 23% | 48% | — | 15% | 21% | 46% | — | 13% | 22% | 42% |
| $G_{10,000(LTT)}$ | −65°F | −61°F | −52°F | −20°F | −64°F | −54°F | −47°F | −22°F | −62°F | −56°F | −46°F | −25°F |

*Standard Recipe

TABLE XII

Plasticizers in Herclor H at 20 PHR

| Plasticizers Orig. Properties | None | di-(Butoxy-ethoxyethanol)-Adipate | Di-(Butoxy-ethoxyethanol)-Adipate Stripped | Di-(Butoxy-ethoxyethanol)-Glutarate | Di-(Hexy-loxyethoxyethanol)-Adipate | Di-(Butoxy-ethoxy-ethoxy-ethanol)-Phthalate | Di-(Hexy-loxyethoxy-ethanol)-Phthalate | (High M.W. Polyester Plasticizer) paraplex G-25 (Rohm & Haas) |
|---|---|---|---|---|---|---|---|---|
| Tensile, psi | 2300 | 1770 | 1770 | 1860 | 1800 | 2050 | 1950 | 2200 |
| Elong., % | 240 | 360 | 330 | 310 | 350 | 320 | 310 | 400 |
| 100% Mod. | 1070 | 460 | 560 | 550 | 490 | 550 | 560 | 500 |
| 200% Mod. | 2100 | 1070 | 1220 | 1280 | 1110 | 1300 | 1300 | 1150 |
| Shore A | 81 | 65 | 72 | 70 | 71 | 69 | 70 | 69 |
| G-10,000 | −6° F | −36° F | −39° F | −38° F | −34° F | −24° F | −26° F | −23° F |
| % Perm. Set | 1% | 3% | 1% | 1% | 2% | 3% | 3% | 3% |
| Compatibility | — | OK | OK | OK | OK | OK | OK | OK |
| Samples Heat Aged 70 Hrs. 250° F | | | | | | | | |
| Tensile, psi | 2650 | 1980 | 1850 | 2020 | 2000 | 2180 | 2080 | 2230 |
| Elong., % | 180 | 300 | 280 | 270 | 305 | 280 | 280 | 310 |
| 100% Mod. | 1640 | 590 | 660 | 650 | 610 | 680 | 660 | 600 |

TABLE XII-continued

Plasticizers in Herclor H at 20 PHR

| Plasticizers Orig. Properties | None | di-(Butoxy-ethoxyethanol) Adipate | Di-(Butoxy-ethoxyethanol)-Adipate Stripped | Di-(Butoxy-ethoxyethanol)-Glutarate | Di-(Hexy-loxyethoxy-ethanol)-Adipate | Di-(Butoxy-ethoxyethoxy-ethanol)-Phthalate | Di-(Hexy-loxyethoxy-ethanol)-Phthalate | (High M.W. Polyester Plasticizer) paraplex G-25 (Rohm & Haas) |
|---|---|---|---|---|---|---|---|---|
| 200% Mod. | — | 1340 | 1420 | 1510 | 1350 | 1600 | 1530 | 1410 |
| Shore A | 91 | 76 | 78 | 79 | 76 | 74 | 75 | 77 |
| Wt. % Loss | 0.6 | 3.3 | 2.3 | 2.7 | 2 | 1 | 1 | 0.8 |
| % Plast. Loss | — | 24% | 16% | 19% | 13% | 4% | 4% | 2.7% |
| G-10,000 | — | −29° F | −34° F | −34° F | 31° F | −23° F | −25° F | −19° F |
| Samples Heat Aged 70 Hrs. 300° F | | | | | | | | |
| Tensile, psi | 23500 | 1925 | 1850 | 2000 | 1820 | 2050 | 1890 | 2225 |
| Elong., % | 140 | 250 | 220 | 210 | 250 | 240 | 240 | 260 |
| 100% Mod. | 1750 | 820 | 900 | 1050 | 710 | 750 | 775 | 830 |
| 200% Mod. | — | 1620 | 1700 | 1940 | 1510 | 1730 | 1620 | 1800 |
| Shore A | 93 | 83 | 86 | 87 | 83 | 81 | 81 | 83 |
| Wt. % Loss | 0.8 | 5.7 | 5 | 7.3 | 3 | 1.4 | 1.7 | 1.2 |
| % Plast. Loss | — | 45% | 37% | 59% | 20% | 6% | 8% | 4% |
| G-10,000 | −4° F | −24° F | −27° F | −21° F | −33° F | −29° F | −28° F | −21° F |

TABLE XIII

Plasticizers in Herclor H at 20 phr. Cured 60'/320° F

| Plasticizers Orig. Properties | None | Di-(Butoxyethoxyethoxy-ethanol)-Mixed Esters from Example 11 | (High M.W. Polyester Plasticizer) Paraplex G-25 (Rohm & Haas) | Polyester Plasticizer Paraplex G-50 (Rohm & Haas) | (Polymeric Plasticizer) (Union Camp) Uniflex 300 | (Polymeric Plasticizer) (Union Camp) Uniflex 300 |
|---|---|---|---|---|---|---|
| Tensile, psi | 2300 | 1900 | 2200 | 2090 | 2100 | 2100 |
| Elong., % | 240 | 320 | 400 | 380 | 360 | 380 |
| 100% Mod. | 1070 | 590 | 500 | 530 | 590 | 510 |
| 200% Mod. | 2100 | 1290 | 1150 | 1220 | 1300 | 1200 |
| Shore A | 81 | 69 | 69 | 71 | 70 | 70 |
| G-10,000 | −6% | −35° F | −23° F | −17° F | −180° F | −18° F |
| % Perm. Set | 1% | 2% | 3% | 5% | 5% | 5% |
| Compatibility | — | OK | OK | OK | OK | OK |
| Samples Heat Aged at 250° F for 70 Hrs. | | | | | | |
| Tensile, psi | 2650 | 1990 | 2230 | 2150 | 2150 | 2200 |
| Elong., % | 180 | 250 | 310 | 310 | 290 | 305 |
| 100% Mod. | 1640 | 740 | 600 | 680 | 610 | 690 |
| 200% Mod. | — | 1610 | 1410 | 1410 | 1500 | 1500 |
| Shore A | 91 | 78 | 77 | 79 | 79 | 78 |
| Wt. % Loss | 0.6 | 2.1 | 0.8 | 1.1 | 0.95 | 0.81 |
| % Plast. Loss | — | 14% | 2.7% | 5% | 4% | 3% |
| Samples Heat Aged at 300° F for 70 Hrs. | | | | | | |
| Tensile, psi | 2350 | 1810 | 2225 | 1900 | 1950 | 2000 |
| Elong., % | 140 | 210 | 260 | 250 | 250 | 270 |
| 100% Mod. | 1750 | 900 | 830 | 750 | 710 | 780 |
| 200% Mod. | — | 1700 | 1800 | 1550 | 1630 | 1600 |
| Shore A | 93 | 80 | 83 | 79 | 80 | 80 |
| Wt. % Loss | 0.8 | 2.8 | 1.2 | 1.6 | 1.4 | 1.1 |
| % Plast. Loss | — | 18% | 4% | 8% | 6% | 4% |
| G-10,000 | −4° F | −29° F | −21° F | 15° F | 18° F | −17° F |

EXAMPLE 15

Elastomers were compounded in the formulations shown. The test data on curing and after heat ageing is shown in the following tables.

| FORMULATIONS | Parts |
|---|---|
| 1. Hypalon 40 (chlorosulphonated polyethylene Rubber-duPont) | 100 |
| Magnesium Oxide | 4 |
| A/C Polyethylene 617A | 2 |
| Benzothiazyldisulfide | 0.5 |
| Dipentamethylene-thiuram tetrasulfide | 2 |
| SRF Carbon Black | 55 |
| Plasticizer | 20 or 30 |
| 2. Herclor H (polyepichlorohydrin rubber) (Hercules) | 100 |
| Zinc Stearate | 1 |
| 2-Mercaptoimidazoline | 1.5 |
| Red Lead | 5 |
| Nickel dithiodibutylcarbamate | 1 |
| SRF | 50 |
| 3 Carbon Black Plasticizer | 20 |
| 3. Hydrin 100 (polyepichlorohydrin rubber) (B. F. Goodrich) | 100 |
| Zinc Stearate | 1 |
| 2-Mercaptoimidazoline | 1.5 |
| Red Lead | 5 |
| Nickel dithiodibutylcarbamate | 1 |
| SRF | 50 |
| 3 Carbon Black Plasticizer | 20 or 30 |

TABLE XIV

Plasticizers in Hypalon 40 at 20 PHR Cured 30'/307° F

| Plasticizers Orig. Properties | None | Di-(Butoxy-ethoxyethanol) Adipate | Di-(Butoxy-ethoxyethanol)-Adipate Stripped | Di-(Butoxy-ethoxyethanol)-Glutarate | Di-(Hexy-loxyethoxy-ethanol)-Adipate | Di-(Butoxy-ethoxyethoxy-ethanol)-Phthalate | Di-(Hexyloxy-ethoxyethanol)-Phthalate | Dioctyl-Sebacate |
|---|---|---|---|---|---|---|---|---|
| Tensile, psi | 3900 | 2900 | 3090 | 2700 | 3120 | 3180 | 2810 | 2800 |
| Elong., % | 210 | 250 | 280 | 240 | 290 | 300 | 260 | 250 |

TABLE XIV-continued

Plasticizers in Hypalon 40 at 20 PHR
Cured 30'/307° F

| Plasticizers Orig. Properties | None | Di-(Butoxy-ethoxyethanol)-Adipate | Di-(Butoxy-ethoxyethanol)-Adipate Stripped | Di-(Butoxy-ethoxyethanol)-Glutarate | Di-(Hexy-loxyethanol)-Adipate | Di-(Butoxy-ethoxyethoxy-ethanol)-Phthalate | Di-(Hexyloxyethoxyethanol)-Phthalate | Dioctyl-Sebacate |
|---|---|---|---|---|---|---|---|---|
| 100% Mod. | 1450 | 700 | 700 | 780 | 670 | 610 | 690 | 890 |
| 200% Mod. | 3750 | 2100 | 2100 | 2140 | 2090 | 2000 | 2100 | 2200 |
| Shore A | 83 | 70 | 69 | 70 | 73 | 71 | 73 | 77 |
| G-10,000 | +9° F | −31° F | −34° F | −33° F | −33° F | −22° F | −23° F | −34° F |
| % Perm. Set | 1% | 1% | 2% | 0 | 1% | 1% | 1% | 1% |
| Samples Heat Aged 70 hrs. 250° F | | | | | | | | |
| Tensile, psi | 3400 | 3150 | 3200 | 3000 | 3270 | 3130 | 3220 | 3060 |
| Elong., % | 180 | 210 | 240 | 220 | 250 | 250 | 250 | 230 |
| 100% Mod. | 2000 | 1160 | 1040 | 1070 | 880 | 840 | 860 | 1000 |
| 200% Mod. | — | 2875 | 2710 | 2750 | 2550 | 2520 | 2560 | 2675 |
| Shore A | 85 | 77 | 75 | 77 | 74 | 73 | 73 | 73 |
| Wt. % Loss | 0.65 | 2.6 | 1.2 | 2 | 0.8 | 1.2 | 1.2 | 1.8 |
| % Plast. Loss | — | 18% | 6% | 15% | 2% | 6% | 6% | 11% |
| G-10,000 | +3° F | −29° F | −34° F | −32° F | −29° F | −22° F | −22° F | −32° F |
| Tensile, psi | 2475 | 2700 | 2480 | 3010 | 2660 | 2525 | 2520 | 2510 |
| Elong., % | 90 | 110 | 120 | 140 | 140 | 130 | 120 | 105 |
| 100% Mod. | — | 2500 | 2180 | 2400 | 2080 | 2275 | 2250 | 2200 |
| 200% Mod. | — | — | — | — | — | — | — | — |
| Shore A | 88 | 92 | 88 | 89 | 90 | 90 | 90 | 90 |
| Wt. % Loss | 1.8 | 8.3 | 6.8 | 8.5 | 6 | 5.5 | 5.6 | 8.3 |
| % Plast. Loss | — | 61% | 47% | 63% | 39% | 36% | 37% | 61% |
| G-10,000 | +2° F | −5° F | −9° F | −3° F | −14° F | −12° F | −14° F | −10° F |

TABLE XV

Evaluation of Plasticizers in Hypalon 40 at 30 phr.

| Physical Prop. | Control (No Plasticizer) Orig. Prop. | Control 70 Hrs. Aging 250° F | Control 70 Hrs. Aging 300° F | Di-(Butoxyethoxy-ethanol)-Glutarate Orig. Prop. | Di-(Butoxyethoxy-ethanol)-Glutarate 250° F | Di-(Butoxyethoxy-ethanol)-Glutarate 300° F | Di-(Butoxyethoxy-ethanol)-Adipate Orig. Prop. | Di-(Butoxyethoxy-ethanol)-Adipate 250° F | Di-(Butoxyethoxy-ethanol)-Adipate 300° F | Di-(Hexyloxyethoxyethanol Mixed Esters-Example 10 Orig. Prop. | 250° F | 300° F |
|---|---|---|---|---|---|---|---|---|---|---|---|---|
| Tensile, psi | 3900 | 3400 | 2475 | 2690 | 2800 | | 2820 | 3000 | | 2790 | 2580 | |
| Elong., % | 210 | 180 | 90 | 260 | 230 | | 290 | 250 | | 280 | 220 | |
| 100% Mod. | 1450 | 2000 | | 640 | 800 | | 600 | 900 | | 690 | 710 | |
| 200% Mod. | 3750 | | | 1920 | 2330 | | 1840 | 2500 | | 1900 | 2200 | |
| Shore A | 83 | 85 | 88 | 65 | 72 | | 65 | 71 | | 65 | 69 | |
| Wt. % Loss | X | 0.65 | 1.8 | X | 2.2 | | X | 3.3 | | X | 1.6 | |
| % Plast. Loss | X | X | X | X | 11 | | X | 18 | | X | 7 | |
| Perm. Set | 1 | 1 | 1 | NA | 1 | | NA | 1 | | NA | 1 | |
| Low Temp (PNT) | +9° F | +3° F | +2° F | −46° F | −45° F | | −41° F | "37° F | | −34° F | −34° E | |

| | Di-(Butoxyethoxyethoxy-ethanol)mixed esters from Example 11 | Dioctyl Sebacate Orig. | Dioctyl Sebacate 250° F | Dioctyl Sebacate 300° F | Dioctyl Phthalate Orig. | Dioctyl Phthalate 250° F | Dioctyl Phthalate 300° F |
|---|---|---|---|---|---|---|---|
| Tensile, psi | | 2650 | 2800 | 2075 | 2900 | 3150 | 2800 |
| Elong., % | | 270 | 230 | 120 | 300 | 240 | 90 |
| 100% Mod. | | 600 | 750 | 1800 | 600 | 850 | — |
| 200% Mod. | Bleeding at R.T. | 1750 | 2250 | — | 1700 | 2450 | — |
| Shore A | After Molding | 63 | 66 | 85 | 62 | 73 | 96 |
| Wt. % Loss | | X | 1.5 | 11.2 | X | 4 | 17 |
| % Plast. Loss | | X | 6 | 62 | X | 21 | 99 |
| Perm. Set | | 1 | 1 | 0 | | | |
| Low Temp. (PNT) | | −49° F | −42° F | −27° F | −36° F | −19° F | −6° F |

TABLE XVI

Evaluation of Plasticizers in Hydrin 100 at 30 phr.

| Physical Prop. | Control (No Plasticizer) Orig. Prop. | Control 70 Hrs. H. Aging 250° F | Control 70 Hrs. H. Aging 300° F | Di-(Butoxyethoxy-ethanol)-Glutarate Orig. Prop. | 250° F | 300° F | Di-(Butoxyethoxy-ethanol)-Adipate Orig. Prop. | 250° F | 300° F |
|---|---|---|---|---|---|---|---|---|---|
| Tensile, psi | 2400 | 2600 | 2110 | 1085 | 1290 | 1310 | 960 | 1200 | 1010 |
| Elong., % | 360 | 290 | 230 | 430 | 350 | 305 | 410 | 370 | 300 |
| 100% Mod. | 490 | 600 | 800 | 190 | 250 | 390 | 200 | 210 | 320 |
| 200% Mod. | 1220 | 1700 | 1900 | 470 | 610 | 810 | 440 | 520 | 690 |
| Shore A | 65 | 71 | 76 | 42 | 50 | 65 | 46 | 52 | 59 |
| Wt. % Loss | X | 1 | 1.3 | X | 3.6 | 12.1 | X | 4.3 | 7.3 |
| % Plast. Loss | X | X | X | X | 16 | 62 | X | 20 | 35 |
| Perm. Set | NA | 1 | 2 | NA | 2 | 3 | NA | 2 | 3 |
| G-10,000 (LTT) | −8°F | −7° F | −7°F | −53°F | −44°F | −28°F | −49°F | −42°F | −37°F |

| | Di-(Hexyloxyethoxyethanol)-Mixed Esters Example 10 | | | Di-(Butethoxyethoxyethanol)-mixed esters-Ex. 11 | | |
|---|---|---|---|---|---|---|
| Tensile, psi | 1060 | 1200 | 1000 | 1080 | 1190 | 900 |
| Elong., % | 410 | 340 | 280 | 340 | 290 | 220 |
| 100% Mod. | 210 | 250 | 300 | 260 | 300 | 370 |
| 200% Mod. | 490 | 600 | 700 | 620 | 710 | 800 |
| Shore A | 44 | 52 | 60 | 47 | 56 | 60 |
| Wt. % Loss | X | 3 | 5.5 | X | 2.8 | 3.6 |
| % Plast. Loss | X | 12 | 25 | X | 11 | 14 |
| Perm. Set | NA | 2 | 1 | NA | 1 | 1 |

TABLE XVI-continued

| | Evaluation of Plasticizers in Hydrin 100 at 30 phr. | | | | | |
|---|---|---|---|---|---|---|
| G-10,000 (LTT) | −50°F | −47°F | −39°F | −48°F | −44°F | −42°F |

EXAMPLE 16

Elastomers are compounded of the formulations shown. Test data of the compounds on curing and after ageing are shown in the following tables.

| FORMULATIONS | Parts |
|---|---|
| 1. Herclor H | 100 |
| Zinc Stearate | 1 |
| 2-Mercaptoimidazoline | 1.5 |
| Red Lead | 5 |
| Nickel dithiodibutylcarbamate | 1 |
| SRF #3 Carbon Black | 50 |
| Plasticizer | 20 |
| Cured 60 min. at 320° F | |
| 2. Herclor C (epichlorohydrin copolymer with ethylene oxide) (Hercules) | 100 |
| Zinc Stearate | 1 |
| 2-Mercaptoimidazoline | 1.5 |
| Red Lead | 5 |
| Nickel dithiodibutylcarbamate | 1 |
| SRF #3 Carbon Black | 50 |
| Plasticizer | 20 |
| Cured 45 min. at 340° F | |

-continued

| FORMULATIONS | Parts |
|---|---|
| 3. Hydrin 100 | 100 |
| Zinc Stearate | 1 |
| 2-Mercaptoimidazoline | 1.5 |
| Red Lead | 5 |
| Nickel dithiodibutylcarbamate | 1 |
| SRF #Carbon Black | 50 |
| Plasticizer | 20 |
| Cured 45 min. at 310° F | 20 |
| 4. Hydrin 200 | 100 |
| Zinc Stearate | 1 |
| 2-Mercaptoimidazoline | 1.5 |
| Red Lead | 5 |
| Nickel dithiodibutylcarbamate | 1 |
| SRF #3 Carbon Black | 50 |
| Plasticizer | 20 |
| Cured 45 min. at 310° F | |
| 5. Hypalon 40 | 100 |
| Magnesium Oxide | 4 |
| A/C Polyethylene 617A | 2 |
| Benzothiazldisulfide | 0.5 |
| Dipentamethylene-thiuram tetrasulfide | 2 |
| SRF Carbon Black | 55 |
| Plasticizer | 20 |
| Cured 30 min. at 307° F | |

TABLE XVII

Plasticizers in Herclor H

| Plasticizers<br>Orig. Properties | None | Di-(Butoxyethoxy-ethanol)-Adipate | DOP | Paraplex G-25 | B.T.P. | B.T.P. (Stabilized with antioxidant) | B.T. DBE-2 | Uniflex 330 |
|---|---|---|---|---|---|---|---|---|
| Tensile, psi | 2300 | 1750 | 2000 | 2100 | 2000 | 1920 | 1800 | 2100 |
| Elong., % | 240 | 340 | 350 | 380 | 340 | 320 | 310 | 380 |
| 100% Mod. | 1070 | 450 | 475 | 500 | 500 | 515 | 475 | 510 |
| 200% Mod. | 2100 | 1125 | 1175 | 1200 | 1250 | 1250 | 1150 | 1200 |
| Shore A | 81 | 66 | 67 | 68 | 68 | 68 | 66 | 70 |
| G-10,000 | −6° F | −38° F | −29° | −21° F | −26° F | −26° F | −36° F | −18° F |
| % Perm. Set | 1% | 3 | 5 | 3 | 3 | 2 | 3 | 5 |
| Compatibility | — | OK | OK | OK | OK | OK | OK | OK |
| Samples Heat Aged 70 Hrs. 250° F | | | | | | | | |
| Tensile, psi | 2650 | 1910 | 2190 | 2220 | 2130 | 2160 | 2040 | 2200 |
| Elong., % | 180 | 260 | 300 | 300 | 280 | 290 | 290 | 305 |
| 100% Mod. | 1640 | 610 | 600 | 650 | 625 | 640 | 660 | 690 |
| 200% Mod. | — | 1420 | 1480 | 1520 | 1550 | 1560 | 1500 | 1500 |
| Shore A | 91 | 77 | 74 | 75 | 73 | 74 | 75 | 78 |
| Wt. % Loss | 0.6 | 2.6 | 3.8 | 0.8 | 0.9 | 1.2 | 2.8 | 0.8 |
| % Plast. Loss | — | 23% | 34% | 7% | 8% | 11% | 25% | 7% |
| G-10,000 | NA | NA | NA | NA | NA | NA | NA | NA |
| Samples Heat Aged 70 Hrs. 300°F | | | | | | | | |
| Tensile, psi | 2350 | 1920 | 2250 | 2175 | 1650 | 2100 | 1940 | 2000 |
| Elong., % | 140 | 230 | 205 | 250 | 200 | 260 | 240 | 270 |
| 100% Mod. | 1750 | 800 | 1240 | 800 | 750 | 750 | 775 | 780 |
| 200% Mod. | — | 1750 | 2175 | 1755 | — | 1650 | 1680 | 1600 |
| Shore A | 93 | 83 | 87 | 82 | 78 | 20 | 81 | 80 |
| Wt. % Loss | 0.8 | 6 | 12 | 1.0 | 1.5 | 1.8 | 3.3 | 1.1 |
| % Plast. Loss | — | 55% | 100% | 9% | 13% | 16% | 30% | 10% |
| G-10,000 | −4° F | −22° F | −7° F | −18° F | −23° F | −22° F | −29° F | −17° F |

DOP = Dioctyl Phthalate
B.T.P. = Di-(Butoxyethoxyethoxyethanol)-Phthalate
B.T.DBE-2 = Di-Butoxyethoxyethoxyethanol)-Mixed Esters-Example 11

TABLE XVIII

Plasticizers in Herclor C

| Plasticizers<br>Orig. Properties | None | Di-(Butoxyethoxy-ethanol)-Adipate | DOP | B.T.P. | B.T.P. (Stabilized with antioxidant) | B.T.DBE-2 |
|---|---|---|---|---|---|---|
| Tensile, psi | 2325 | 1750 | 1900 | 1950 | 1920 | 1750 |
| Elong., % | 270 | 380 | 360 | 380 | 380 | 350 |
| 100% Mod. | 800 | 450 | 425 | 500 | 450 | 450 |
| 200% Mod. | 1850 | 1050 | 1050 | 1150 | 1100 | 1050 |
| Shore A | 77 | 67 | 65 | 65 | 68 | 65 |
| G-10,000 | −41° F | −59° F | −52° F | −52° F | −51° F | −57° F |
| % Perm. Set | 1 | 5 | 3 | 3 | 3 | 2 |
| Compatibility | — | OK | OK | OK | OK | OK |

TABLE XVIII-continued
Plasticizers in Herclor C

| Plasticizers<br>Orig. Properties | None | Di-(Butoxyethoxy-<br>ethanol)-Adipate | DOP | B.T.P. | B.T.P.<br>(Stabilized with<br>antioxidant) | B.T.DBE-2 |
|---|---|---|---|---|---|---|
| Samples Heat Aged 70 Hrs. 250° F | | | | | | |
| Tensile, psi | 2460 | 1900 | 2020 | 2080 | 1950 | 1810 |
| Elong. % | 220 | 310 | 300 | 310 | 300 | 280 |
| 100% Mod. | 590 | 550 | 570 | 550 | 550 | 520 |
| 200% Mod. | 2250 | 1300 | 1300 | 1350 | 1290 | 1230 |
| Shore A | 82 | 73 | 74 | 70 | 72 | 74 |
| Wt. % Loss | 0.9 | 2.7 | 5.5 | 1.5 | 1.8 | 3.5 |
| % Plast. Loss | — | 25% | 49% | 14% | 16% | 31% |
| G-10,000 | NA | NA | NA | NA | NA | NA |
| Tensile, psi | 2180 | 1650 | 1940 | 1690 | 1550 | 1725 |
| Elong., % | 190 | 270 | 220 | 270 | 250 | 260 |
| 100% Mod. | 1050 | 600 | 920 | 550 | 575 | 600 |
| 200% Mod. | — | 1250 | 1775 | 1250 | 1275 | 1275 |
| Shore A | 95 | 78 | 87 | 74 | 76 | 77 |
| Wt. % Loss | 1.3 | 5.6 | 12.0 | 2.0 | 2.6 | 4.3 |
| % Plast. Loss | — | 50% | 100% | 18% | 24% | 38% |
| G-10,000 | −39°F | −49° F | −39° F | −51° F | −48° F | −52° F |

DOP = Dioctyl Phthalate
B.T.P. = Di-(Butoxyethoxyethanol)-Phthalate
B.T.DBE-2 = Di-(Butoxyethoxyethanol)-Mixed Esters-Example 11

TABLE XIX
Plasticizers in Hydrin 100

| Plasticizers<br>Orig. Properties | None | Di-(Butoxyethoxy-<br>ethanol-Adipate | DOP | B.T.P. | B.T.P.<br>(Stabilized with<br>antioxidant | B.T.DBE-2 |
|---|---|---|---|---|---|---|
| Tensile, psi | 2420 | 1750 | 1945 | 1960 | 1950 | 1830 |
| Elong., % | 960 | 390 | 390 | 360 | 360 | 350 |
| 100% Mod. | 990 | 450 | 470 | 500 | 520 | 510 |
| 200% Mod. | 2020 | 1000 | 1100 | 1140 | 1175 | 1180 |
| Shore A | 85 | 66 | 69 | 70 | 69 | 70 |
| G-10,000 | −5° F | −34° F | −27° F | −24° F | −26° F | −33° F |
| % Perm. Set | 2% | 7% | 8% | 3% | 6% | 8% |
| Compatibility | — | OK | OK | OK | OK | OK |
| Samples Heat Aged 70 Hrs. 250° F | | | | | | |
| Tensile, psi | 2640 | 1980 | 2040 | 2130 | 2100 | 1990 |
| Elong., % | 205 | 290 | 280 | 260 | 260 | 270 |
| 100% Mod. | 1350 | 680 | 700 | 710 | 720 | 710 |
| 200% Mod. | 2580 | 1490 | 1520 | 1680 | 1700 | 1595 |
| Shore A | 87 | 77 | 81 | 75 | 75 | 76 |
| Wt. % Loss | 0.9 | 2.8 | 5.7 | 1.0 | 1.3 | 2.6 |
| % Plast. Loss | — | 25% | 51% | 69% | 11% | 23% |
| G-10,00 | | NA | NA | NA | NA | NA |
| Tensile, psi | 2460 | 1850 | 2150 | 1975 | 1925 | 1880 |
| Elong., % | 160 | 250 | 230 | 230 | 240 | 220 |
| 100% Mod. | 1825 | 750 | 1050 | 825 | 850 | 875 |
| 200% Mod. | — | 1525 | 1900 | 1725 | 1700 | 1725 |
| Shore A | 92 | 75 | 88 | 72 | 83 | 83 |
| Wt. % Loss | 1.2 | 4.6 | 10.6 | 1.5 | 1.9 | 3.5 |
| % Plast. Loss | — | 41% | 95% | 13% | 16% | 32% |
| G-10,000 | −5° F | −29° F | −8° F | −24° F | −23° F | −28° F |

DOP = Dicotyl Phthalate
B.T.P. = Di-(Butoxyethoxyethoxyethanol)-Phthalate
B.T.BDE-2 = Di-(Butoxyethoxyethoxyethanol)-Mixed Esters Example 11

TABLE XX
Plasticizers in Hydrin 200

| Plasticizers<br>Orig. Properties | None | Di-(Butoxyethoxy-<br>ethanol)-Adipate | DOP | Paraplex<br>G-25 | B.T.P. | B.T.P.<br>(Stabilized with<br>antioxidant) | B.T.DBE-2 |
|---|---|---|---|---|---|---|---|
| Tensile, psi | 2150 | 1670 | 1870 | 1960 | 1870 | 1850 | 1750 |
| Elong., % | 260 | 430 | 430 | 480 | 420 | 430 | 420 |
| 100% Mod. | 940 | 400 | 450 | 410 | 460 | 440 | 410 |
| 200% Mod. | 1790 | 880 | 960 | 950 | 1010 | 1000 | 910 |
| Shore A | 82 | 65 | 63 | 65 | 66 | 66 | 66 |
| G-10,000 | −41° F | −64° F | −57° F | −49° F | −55° F | −55° F | −61° F |
| % Perm. Set | 3%  3% | 5% | 5% | 5% | 3% | 2% | |
| Compatibility | OK | OK | OK | OK | 0K | OK | OK |
| Samples Heat Aged 70 Hrs. 250° F | | | | | | | |
| Tensile, psi | 2650 | 2000 | 2200 | 2090 | 2100 | 2175 | 2150 |
| Elong., % | 230 | 360 | 340 | 340 | 320 | 310 | 340 |
| 100% Mod. | 1200 | 500 | 575 | 480 | 550 | 580 | 550 |
| 200% Mod. | 2375 | 1110 | 1290 | 1175 | 1250 | 1325 | 1275 |
| Shore A | 85 | 70 | 72 | 69 | 72 | 73 | 73 |
| Wt. % Loss | 1.0 | 3.1 | 4.6 | 1.4 | 1.5 | 1.7 | 3.1 |

TABLE XX-continued

Plasticizers in Hydrin 200

| Plasticizers<br>Orig. Properties | None | Di-(Butoxyethoxy-ethanol)-Adipate | DOP | Paraplex G-25 | B.T.P. | B.T.P. (Stabilized with antioxidant) | B.T.DBE-2 |
|---|---|---|---|---|---|---|---|
| % Plast. Loss | — | 28% | 42% | 13% | 13% | 15% | 28% |
| G-10,000 | NA | NA | NA | NA | NA | NA | NA |
| Tensile, psi | 2245 | 1800 | 2050 | 1970 | 1850 | 1800 | 1700 |
| Elong., % | 200 | 290 | 240 | 300 | 280 | 290 | 280 |
| 100% Mod. | 1200 | 560 | 850 | 570 | 550 | 550 | 550 |
| 200% Mod. | — | 1280 | 1720 | 1375 | 1225 | 1225 | 1250 |
| Shore A | 88 | 77 | 84 | 73 | 74 | 76 | 77 |
| Wt. % Loss | 1.1 | 6.4 | 13.0 | 1.7 | 2.0 | 2.5 | 4.4 |
| % Plast. Loss | — | 54% | 100% | 15% | 18% | 22% | 39% |
| G-10,000 | −41° F | −52° F | −41° F | −49° F | −52° F | −52° F | −53° F |

DOP = Dicotyl Phthalate
B.T.P. = Butoxyethoxyethoxyethanol)-Phthalate
B.T.DBE-2 = Butoxyethoxyethoxyethanol)-Mixed Esters-Example 11

TABLE XXI

Plasticizers in Hypalon 40

| Plasticizers<br>Orig. Properties | None | Di-(Butoxyethoxy-ethanol)-Adipate | DOS | B.T.P | B.T.P. (Stabilized with antioxidant) | B.T.BDE-2 | Uniflex 330 | H.C.P. | H.C.A. |
|---|---|---|---|---|---|---|---|---|---|
| Tensile, psi | 3900 | 2720 | 2845 | | | | 2875 | 2810 | 3120 |
| Elong., % | 210 | 240 | 270 | | | | 200 | 260 | 290 |
| 100% Mod. | 1450 | 775 | 750 | | | | 1025 | 690 | 670 |
| 200% Mod. | 3750 | 2260 | 2110 | BLEEDING | BLEEDING[1] | BLEEDING[2] | 2850 | 2100 | 2090 |
| Shore A | 83 | 72 | 71 | | | | 75 | 73 | 73 |
| G-10,000 | +9° F | −35° F | −39° F | | | | −7° F | −23° F | −33° F |
| % Perm. Set | 1% | 1% | 2% | | | | 0 | 1% | 1% |
| Compatibility | — | OK | OK | | | | OK | OK | OK |
| Samples Heat Aged 70 Hrs. 250° F | | | | | | | | | |
| Tensile, psi | 3400 | 3025 | 2980 | | | | | 3220 | 3270 |
| Elong., % | 180 | 200 | 220 | | | | | 250 | 250 |
| 100% Mod. | 2000 | 1200 | 1050 | | | | | 860 | 880 |
| 200% Mod. | — | — | 2725 | | | | BLEEDING[3] | 2560 | 2550 |
| Shore A | 85 | 79 | 75 | | | | | 73 | 74 |
| Wt. % Loss | 0.65 | 2.2 | 1.5 | | | | | 1.2 | 1.3 |
| % Plast. Loss | — | 20% | 13% | | | | | 11% | 12% |
| G-10,000 | +3° F | NA | NA | | | | | NA | NA |
| Samples Heat Aged 70 Hrs. 300° F | | | | | | | | | |
| Tensile, psi | 2475 | 2850 | 2410 | | | | 2440 | 2520 | 2660 |
| Elong., % | 90 | 105 | 110 | | | | 105 | 120 | 140 |
| 100% Mod. | — | 2750 | 2270 | | | | 2050 | 2250 | 2080 |
| 200% Mod. | — | — | — | | | | — | — | — |
| Shore A | 88 | 93 | 92 | | | | 91 | 90 | 90 |
| Wt. % Loss | 1.8 | 8.7 | 7.1 | | | | 2.4 | 5.6 | 6 |
| % Plast. Loss | — | 79% | 65% | | | | 22% | 52% | 54% |
| G-10,000 | +2° F | −9° F | −26° F | | | | −6° F | −14° F | −14° F |

[1]This sample, with antioxidant, bleeds more than identical plasticizer, which has no stabilizer.
[2]The Di-(Butoxyethoxyethoxyethanol)-Mixed Esters-Example 2 ester bleeds more than the butoxy triglycol phthalate.
[3]After 70 hrs. 250° F this sample looked similar to the original R.T. Di-(Butoxyethoxyethoxyethanol)-phthalate (with hydroquinone) sample.
[4]Although bleeding, 70 hrs. at 300° F only showed a 27% plasticizer loss.
DOS = Dioctyl Sebacate
B.T.P. = Di-(Butoxyethoxyethoxyethanol)-Phthalate
B.T.DBE-2 = Di-(Butoxyethoxyethoxyethanol)-Mixed Esters-Example 11
H.C.P. = Di-(Hexyloxyethoxyethanol)Phthalate
H.C.A = Di-(Hexyloxyethoxyethanol)-Adipate

EXAMPLE 17

Elastomer formulations were compounded in the proportions shown. The results obtained after cure and on heat ageing and exposure to various solvents are shown in the following tables.

| FORMULATIONS | Parts |
|---|---|
| 1. Hydrin 100 | 100 |
| Red Lead | 5 |
| 2-Mercaptoimidazoline | 1.5 |
| TE-75 | 1.5 |
| Nickel dithiodibutylcarbamate | 1 |

-continued

| FORMULATIONS | Parts |
|---|---|
| SRF #3 Carbon Black | 50 |
| Plasticizer | 20 |
| Cured 45 min. at 310° F | |
| 2. Hydrin 200 | 100 |
| Red Lead | 5 |
| 2-Mercaptoimidazoline | 1.5 |
| TE-75 | 1.5 |
| Nickel dithiodibutylcarbamate | 1 |
| SRF #3 Carbon Black | 50 |
| Plasticizer | 20 |
| Cured 45 min. at 310° F | |

TABLE XXII

| Plasticizer Orig. Properties | Plasticizers in Hydrin 100 | | |
|---|---|---|---|
| | Di-(Butoxyethoxy-ethanol)-Adipate | Di(Butoxyethoxy-ethoxyethanol)-Phthalate | Di-(Butoxyethoxyethoxy-ethanol)-mixed Esters-Example 11 |
| Tensile, psi | 1660 | 1860 | 1750 |
| Elongation % | 330 | 330 | 300 |
| 100% Mod. | 500 | 520 | 500 |
| 200% Mod. | 1080 | 1200 | 1110 |
| Duro A | 69 | 69 | 68 |
| Tear Die "C" | 160 | 165 | 150 |
| L.T.T. (G10,000° F) | −39 | −27 | −34 |
| Compatibility | OK | OK | OK |
| Heat Ageing Properties-70 Hrs./300° F | | | |
| Tensile, psi | 1960 | 1695 | 1510 |
| % Change | +21 | −9 | −13 |
| Elongation % | 200 | 200 | 190 |
| % Change | −39 | −39 | −36 |
| 100% Mod. | 1150 | 900 | 810 |
| 200% Mod. | 1960 | 1695 | — |
| Duro A | 87 | 80 | 80 |
| Pts. Change | +18 | +11 | +12 |
| L.T.T. (G10,000° F) | −19 | −23 | −28 |
| Plasticizer Loss % | 4 | 2 | 2 |
| Heat Ageing Properties-7 days at 300° F | | | |
| Tensile, psi | 1260 | 1130 | 1110 |
| % Change | −24 | −31 | −36 |
| Elongation % | 185 | 190 | 210 |
| % Change | −46 | −42 | −30 |
| 100% Mod. | 810 | 600 | 510 |
| 200% Mod. | — | — | 1070 |
| Duro A | 87 | 80 | 80 |
| Pts. Change | +18 | +11 | +12 |
| L.T.T. (G10,000° F) | −9 | −22 | −27 |
| Plasticizer Loss % | 14 | 7 | 6 |
| Immersion Tests-Ref. Fuel A | | | |
| 24 Hrs. at R.T. | | | |
| Tensile, psi | 1630 | 1840 | 1710 |
| % Change | −2 | −1 | −2 |
| Elongation % | 290 | 300 | 270 |
| % Change | −13 | −10 | −11 |
| Duro A | 68 | 67 | 67 |
| Pts. Change | −1 | −2 | −1 |
| Volume Swell % | 0 | 0 | 0 |
| Ref. Fuel B | | | |
| 24 Hrs. at R.T. | | | |
| Tensile, psi | 1500 | 1640 | 1560 |
| % Change | −10 | −12 | −11 |
| Elongation % | 260 | 250 | 240 |
| % Change | −22 | −23 | −20 |
| Duro A | 64 | 63 | 64 |
| Pts. Change | −5 | −6 | −4 |
| Volume Swell % | +9 | +10 | +9 |
| ASTM Oil #3 | | | |
| 70 Hrs. at 300° F | | | |
| Tensile, psi | 1610 | 1760 | 1640 |
| % Change | −3 | −5 | −6 |
| Elongation % | 270 | 270 | 240 |
| % Change | −17 | −19 | −20 |
| Duro A | 63 | 61 | 61 |
| Pts. Change | −6 | −8 | −7 |
| Volume Swell % | +5 | +7 | +6 |

TABLE XXIII

| Plasticizer | Plasticizers in Hydrin 200 | | |
|---|---|---|---|
| | Di-(Butoxyethoxy-ethanol)-Adipate | Di-(Butoxyethoxy-ethoxyethanol)-Phthalate | Di-(Butoxyethoxyethoxy-ethanol)-Mixed Esters-Example 11 |
| Orig. Properties | | | |
| Tensile, psi | 1650 | 1760 | 1710 |
| Elongation % | 400 | 370 | 380 |
| 100% Mod. | 400 | 420 | 410 |
| 200% Mod. | 910 | 1020 | 970 |
| Duro A | 66 | 67 | 64 |
| Tear Die "C" | 195 | 200 | 190 |
| L.T.T. (G10,000° F) | −60 | −52 | −58 |
| Compatibility | OK | OK | OK |
| Heat Ageing Properties-70 Hrs. at 300° F | | | |
| Tensile, psi | 1800 | 1560 | 1610 |
| % Change | +9 | −11 | −6 |
| Elongation % | 230 | 230 | 250 |
| % Change | −42 | −45 | −34 |
| 100% Mod. | 740 | 600 | 575 |
| 200% Mod. | 600 | 1350 | 1270 |
| Duro A | 83 | 74 | 75 |
| Pts. Change | +17 | +7 | +11 |
| L.T.T. (G10,000° F) | −50 | −49 | −58 |
| Plasticizer Loss % | 3 | 3 | 3 |
| Heat Ageing Properties-7 days at 300° F | | | |

TABLE XXIII-continued

| | Plasticizers in Hydrin 200 | | |
|---|---|---|---|
| Plasticizer | Di-(Butoxyethoxy-ethanol)-Adipate | Di-(Butoxyethoxy-ethoxyethanol)-Phthalate | Di-(Butoxyethoxyethoxy-ethanol)-Mixed Esters-Example 11 |
| Immersion Tests-Ref. Fuel A | ALL SAMPLES BRITTLE | | |
| 24 Hrs. at R. T. | | | |
| Tensile, psi | 1680 | 1720 | 1760 |
| % Change | +2 | +4 | +3 |
| Elongation % | 390 | 350 | 360 |
| % Change | −2 | −4 | −5 |
| Duro A | 67 | 69 | 65 |
| Pts. Change | +1 | +2 | +1 |
| Volume Swell % | +5 | +6 | +5 |
| Ref. Fuel B | | | |
| 24 Hrs. at R.T. | | | |
| Tensile, psi | 1570 | 1640 | 1610 |
| % Change | −5 | −7 | −6 |
| Elongation % | 360 | 330 | 350 |
| % Change | −9 | −10 | −9 |
| Duro A | 61 | 60 | 58 |
| Pts. Change | −5 | −7 | −6 |
| Volume Swell % | +17 | +20 | +18 |
| ASTM Oil #3 | | | |
| 70 Hrs. at 300° F | | | |
| Tensile, psi | 1700 | 1850 | 1780 |
| % Change | +3 | +5 | +4 |
| Elongation % | 340 | 300 | 320 |
| % Change | −15 | −18 | −17 |
| Duro A | 60 | 59 | 57 |
| Pts. Change | −6 | −8 | −7 |
| Volume Swell % | +9 | +11 | +10 |

EXAMPLE 18

Elastomer formulations were compounded in the proportions shown. The results obtained after cure and on heat ageing are shown in the following tables.

| Formulations | A-1 | A-2 | A-3 |
|---|---|---|---|
| Hycar 1052 (Nitrile Rubber) (B. F. Goodrich) | 100 | 100 | 100 |
| SRF #3 Carbon Black | 60 | 60 | 60 |
| Zinc Oxide | 5 | 5 | 5 |
| Stearic Acid | 1.5 | 1.5 | 1.5 |
| Sulfur | 1.75 | 1.75 | 1.75 |
| Benzothiazyldisulfide | 1.5 | 1.5 | 1.5 |
| Sym-Diphenylguanidine | 0.25 | 0.25 | 0.25 |
| Di-(Butoxyethoxyethanol)-Adipate | 20 | — | — |
| Di-(Butoxyethoxyethoxyethanol)-Adipate | — | 20 | — |
| Di-(Butoxyethoxyethoxyethanol)-Mixed Esters (Example 11) | — | — | 20 |
| Cure: 30 minutes at 310° F | | | |

| | B-1 | B-2 | B-3 |
|---|---|---|---|
| Hypalon 40 | 100 | 100 | 100 |
| Litharge | 20 | 20 | 20 |
| Magnesium Oxide | 10 | 10 | 10 |
| SRF Carbon Black | 55 | 55 | 55 |
| Nickel Dithiodibutylcarbamate | 3 | 3 | 3 |
| Benzothiazyldisulfide | 0.5 | 0.5 | 0.5 |
| Dipentamethylenethiuramtetrasulfide | 2 | 2 | 2 |
| Di-(Butoxyethoxyethanol)-Adipate | 20 | — | — |
| Di-(Butoxyethoxyethoxyethanol)-Adipate | — | 20 | — |
| Di-(Butoxyethoxyethoxyethanol)-Mixed Esters (Example 11) | — | — | 20 |
| Cure: 30 minutes at 310° F | | | |

| | C-1 | C-2 | C-3 |
|---|---|---|---|
| Toluene diisocyanate-ethylene propylene-polyadipate rubber (M.W. polyester=2700) | 100 | 100 | 100 |
| SRF Carbon Black | 30 | 30 | 30 |
| Benzothiazyldisulfide | 4 | 4 | 4 |
| Mercaptobenzothiazol | 2 | 2 | 2 |
| Partial Complex of ZnCl₂ with Benzothioxyl-disulfide (Caytur #4-duPont) | 1 | 1 | 1 |
| Cadmium Stearate | 0.5 | 0.5 | 0.5 |
| Sulfur | 1.5 | 1.5 | 1.5 |
| Di-(Butoxyethoxyethanol)-Adipate | 20 | — | — |
| Di-(Butoxyethoxyethoxyethanol)-Adipate | — | 20 | — |
| Di-(Butoxyethoxyethoxyethanol)-Mixed Esters-(Example 11) | — | — | 20 |
| Cure: 45 minutes 287° F | | | |

| | D-1 | D-2 | D-3 |
|---|---|---|---|
| Toluene diisocyanate-polylactone polyol rubber based on caprolactone (M.W. polyactone polyol=1250) | 100 | 100 | 100 |
| SAF Carbon Black | 30 | 30 | 30 |
| Benzothiazyldisulfide | 4 | 4 | 4 |
| Mercaptobenzothiazol | 2 | 2 | 2 |
| Caytur #4 | 1 | 1 | 1 |
| Cadmium Stearate | 0.5 | 0.5 | 0.5 |
| Sulfur | 1.5 | 1.5 | 1.5 |
| Di-(Butoxyethoxyethanol)-Adipate | 20 | — | — |
| Di-(Butoxyethoxyethoxyethanol)-Adipate | — | 20 | — |
| Di-(Butoxyethoxyethoxyethanol)-Mixed Esters (Example 11) | — | — | 20 |
| Cure: 45 minutes at 287° F | | | |

TABLE XXIV

| | Plasticizers in Hycar 1052 | | |
|---|---|---|---|
| Formulations | A-1 | A-2 | A-3 |
| Original Properties | | | |
| Tensile, psi | 2320 | 2680 | 2380 |
| Elongation, % | 550 | 605 | 510 |
| 100% Mod. | 275 | 280 | 275 |
| 200% Mod. | 660 | 700 | 720 |
| Duro A | 60 | 62 | 61 |
| L.T.T. (G10,000)° F | −43 | −29 | −37 |
| L.T. Brittleness D-746 | −59 | −38 | −48 |
| Compatibility | OK | OK | OK |
| Heat Ageing Properties-70 Hrs./212° F | | | |
| Tensile, psi | 2550 | 2610 | 2510 |
| % Change | +10 | 3 | +5 |
| Elongation, % | 370 | 390 | 360 |
| % change | 32 | 35 | 29 |
| 100% Mod. | 470 | 450 | 470 |
| 200% Mod. | 1220 | 1200 | 1270 |
| Duro A | 71 | 70 | 71 |
| Pts. Change | +11 | +8 | +10 |
| L.T.T.(G10,000)° F | −28 | −26 | −32 |
| L.T. Brittleness D-746 | −42 | −38 | −42 |
| % Plasticizer Loss | 4 | 1 | 1 |
| Heat Ageing Properties-70 Hrs./225° F | | | |
| Tensile, psi | 2870 | 2660 | 2570 |
| % Change | +23 | 1 | +8 |
| Elongation, % | 300 | 305 | 290 |
| % Change | 45 | 49 | 43 |
| 100% Mod. | 860 | 700 | 625 |
| 200% Mod. | 2040 | 1700 | 1740 |
| Duro A | 81 | 74 | 73 |
| Pts. Change | +21 | +12 | +12 |
| L.T.T. (G10,000)° F | −7 | −24 | −33 |
| L.T. Brittleness D-746 | −27 | −37 | −45 |
| % Plasticizer Loss | 8 | 2 | 2 |
| Heat Ageing Properties-70 Hrs./250° F | | | |
| Tensile, psi | 2580 | 2240 | 2300 |
| % change | +11 | 18 | 3 |

TABLE XXIV-continued

| Plasticizers in Hycar 1052 | | | |
|---|---|---|---|
| Elongation, % | 170 | 205 | 190 |
| % Change | 69 | 66 | 62 |
| 100% Mod. | 1520 | 900 | 960 |
| 200% Mod. | — | 2100 | — |
| Duro A | 87 | 76 | 78 |
| Pts. Change | +27 | +14 | +17 |
| L.T.T. (G10,000)° F | −3 | −24 | −29 |
| L.T. Brittleness D-746 | −20 | −33 | −38 |
| % Plasticizer Loss | 10 | 3 | 3 |

TABLE XXV

| Plasticizers in Hypalon 40 | | | |
|---|---|---|---|
| Formulations | B-1 | B-2 | B-3 |
| Original Properties | | | |
| Tensile, psi | 2850 | 2910 | 2890 |
| Elongation, % | 260 | 210 | 230 |
| 100% Mod. | 575 | 1000 | 900 |
| 200% Mod. | 1990 | 2750 | 2500 |
| Duro A | 71 | 77 | 77 |
| L.T.T.(G10,00)° F | −34 | −23 | −31 |
| L.T. Brittleness D-746 | −47 | −34 | −44 |
| Compatibility | OK | OK | OK |
| Heat Ageing Properties-70 Hrs./300° F | | | |
| Tensile, psi | 2150 | 2820 | 2350 |
| % Change | 25 | 3 | 18 |
| Elongation, % | 160 | 200 | 160 |
| % Change | 38 | 5 | 31 |
| 100% Mod. | 1300 | 1390 | 1380 |
| Duro A | 84 | 83 | 84 |
| Pts. Change | +13 | +6 | +7 |
| L.T.T. (G10,000)° F | −19 | −24 | −27 |
| L.T. Brittleness D-746 | −37 | −36 | −46 |
| % Plasticizer Loss | 5 | 3 | 3 |

TABLE XXVI

| Plasticizers in Polyester Urethane Rubber | | | |
|---|---|---|---|
| Formulations | C-1 | C-2 | C-3 |
| Original Properties | | | |
| Tensile, psi | 3000 | 3740 | 3610 |
| Elongation, % | 430 | 480 | 500 |
| 100% Mod. | 400 | 410 | 410 |
| 200% Mod. | 950 | 1000 | 1000 |
| Duro A | 65 | 67 | 65 |
| L.T.T. (G10,000)° F | −39 | −28 | −36 |
| L.T. Brittleness D-746 | −47 | −33 | −44 |
| Compatibility | OK | OK | OK |
| Heat Ageing Properties-70 Hrs./212° F | | | |
| Tensile, psi | 3320 | 3825 | 3600 |
| % Change | +1 | +2 | −1 |
| Elongation, % | 390 | 410 | 410 |
| % Change | 9 | 15 | 18 |
| 100% Mod. | 450 | 550 | 520 |
| 200% Mod. | 1250 | 1420 | 1350 |
| Duro A | 69 | 72 | 70 |
| Pts. Change | +4 | +5 | +5 |
| L.T.T. (G10,000)° F | −30 | −23 | −28 |
| L.T. Brittleness D-746 | −41 | −35 | −38 |
| % Plasticizer Loss | 3 | 1 | 1 |
| Heat Ageing Properties-70 Hrs./225°°F | | | |
| Tensile, psi | 2850 | 3640 | 3110 |
| % Change | 5 | 3 | 13 |
| Elongation, % | 330 | 390 | 360 |
| % Change | 23 | 18 | 28 |
| 100% Mod. | 510 | 540 | 550 |
| 200% MOd. | 1370 | 1475 | 1450 |
| Duro A | 70 | 70 | 69 |
| Pts. Change | +5 | +3 | +4 |
| L.T.T. (G10,000)° F | −30 | −22 | −28 |
| L.T. Brittleness D-746 | −37 | −29 | −38 |
| % Plasticizer Loss | 4 | 2 | 2 |
| Heat Ageing Properties-70 Hrs./250° F | | | |
| Tensile, psi | 1880 | 1750 | 1850 |
| % Change | 37 | 53 | 31 |
| Elongation, % | 270 | 270 | 280 |
| % Change | 36 | 43 | 44 |
| 100% Mod. | 510 | 450 | 460 |
| 200% Mod. | 1340 | 1200 | 1200 |
| Duro A | 69 | 68 | 67 |
| Pts. Change | +4 | +1 | +2 |
| L.T.T. (G10,000)° F | −27 | −25 | −25 |
| L.T. Brittleness D-746 | −33 | −33 | −32 |
| % Plasticizer Loss | 5 | 3 | 3 |

TABLE XXVII

| Plasticizers in Polylactonepolyol Urethane Rubber | | | |
|---|---|---|---|
| Formulations | D-1 | D-2 | D-3 |
| Original Properties | | | |
| Tensile, psi | 2740 | 3850 | 3100 |
| Elongation, % | 420 | 480 | 425 |
| 100% Mod. | 375 | 420 | 400 |
| 200% Mod. | 950 | 1050 | 950 |
| Duro A | 64 | 69 | 66 |
| L.T.T. (G10,000)° F | −44 | −31 | −40 |
| L.T. Brittleness D-746 | −57 | −55 | −58 |
| Compatibility | OK | OK | OK |
| Heat Ageing Properties-70 Hrs./212° F | | | |
| Tensile, psi | 2650 | 3490 | 2830 |
| % Change | 3 | 9 | 9 |
| Elongation, % | 285 | 300 | 280 |
| % Change | 32 | 37 | 34 |
| 100% Mod. | 610 | 660 | 650 |
| 200% Mod. | 1550 | 1810 | 1640 |
| Duro A | 73 | 75 | 74 |
| Pts. Change | +9 | +6 | +8 |
| L.T.T. (G10,000)° F | −39 | −24 | −36 |
| L.T. Brittleness D-746 | −58 | −47 | −53 |
| % Plasticizer Loss | 3 | 1 | 1 |
| Heat Ageing Properties-70 Hrs./225° F | | | |
| Tensile, psi | 2450 | 3060 | 2740 |
| % Change | 11 | 21 | 11 |
| Elongation, % | 240 | 270 | 275 |
| 100% Mod. | 690 | 700 | 700 |
| 200% Mod. | 1790 | 1980 | 1900 |
| Duro A | 74 | 75 | 74 |
| Pts. Change | +10 | +6 | +8 |
| L.T.T. (G10,000)° F | −37 | −28 | −36 |
| L.T. Brittleness D-746 | −52 | −40 | −52 |
| % Plasticizer Loss | 4 | 2 | 2 |
| Heat Ageing Properties-70 Hrs./250° F | | | |
| Tensile, psi | 2200 | 2900 | 2100 |
| % Change | 19 | 24 | 32 |
| Elongation, % | 240 | 285 | 240 |
| % Change | 42 | 40 | 41 |
| 100% Mod. | 660 | 610 | 590 |
| 200% Mod. | 1610 | 1675 | 1590 |
| Duro A | 71 | 72 | 70 |
| Pts. Change | +7 | +3 | +4 |
| L.T.T. (G10,000)° F | −38 | −29 | −36 |
| L.T. Brittleness D-746 | −51 | −49 | −52 |
| % Plasticizer Loss | 5 | 3 | 3 |

EXAMPLE 19

Elastomer formulations were compounded in the proportions shown. The results obtained after cure and on heat ageing are shown in the following tables.

| Formulations | A-1 | A-2 | A-3 |
|---|---|---|---|
| Hycar 4041 (B. F. Goodrich) | 100 | 100 | 100 |
| Stearic Acid | 2 | 2 | 2 |
| Fast Extrusion Furnace Carbon Black | 60 | 60 | 60 |
| Acrawax C (Glyco Chem. Co.) | 1 | 1 | 1 |
| Hexamethylene diamine carbamate | 1 | 1 | 1 |
| Di-(Butoxyethoxyethanol)-Adipate | 20 | — | — |
| Di-(Butoxyethoxyethoxyethanol)-Adipate | — | 20 | — |
| Di-(Butoxyethoxyethoxyethanol)-Mixed Esters (Example 11) | — | — | 20 |
| Cure: 30 minutes at 300° F, Tempered at 24 hours at 300° F | | | |

| | B-1 | B-2 | B-3 |
|---|---|---|---|
| Ethyl Acrylate-Allyl glycidyl ether-allyl methacrylate (95-5-0.1) Rubber | 100 | 100 | 100 |
| Stearic Acid | 1 | 1 | 1 |
| Fast Extrusion Furnace Carbon Black | 60 | 60 | 60 |
| Polymerized 1,2-dihydro-2,2,4-trimethyl-quinoline (Flectol H Monsanto) | 1.5 | 1.5 | 1.5 |
| Hexamethylene diamine carbamate | 1 | 1 | 1 |
| Di-(Butoxyethoxyethanol)-Adipate | 20 | — | — |
| Di-(Butoxyethoxyethoxyethanol)-Adipate | — | 20 | — |
| Di-(Butoxyethoxyethoxyethanol)-Mixed Esters (Example 11) | — | — | 20 |
| Cure: 30 minutes at 300° F, Tempered at 24 hours at 300° F | | | |

TABLE XXVIII

Plasticizers in Hycar 4041

| Formulation | A-1 | A-2 | A-3 |
|---|---|---|---|
| Original Properties | | | |
| Tensile, psi | 1140 | 1250 | 1210 |
| Elongation, % | 290 | 270 | 260 |
| 100% Mod. | 350 | 400 | 420 |
| 200% Mod. | 820 | 950 | 960 |
| Duro A | 72 | 65 | 69 |
| L.T.T. (G10,000)° F | −24 | −28 | −34 |
| L.T. Brittleness, D-746 | −30 | −27 | −38 |
| Compatibility | OK | OK | OK |
| Heat Ageing Properties-70 Hrs./300° F | | | |
| Tensile, psi | 1480 | 1170 | 1240 |
| % Change | +30 | 6 | 3 |
| Elongation, % | 240 | 270 | 270 |
| % Change | 17 | 0 | +4 |
| 100% Mod. | 550 | 380 | 450 |
| 200% Mod. | 1310 | 860 | 1000 |
| Duro A | 80 | 69 | 72 |
| Pts. Change | +8 | +4 | +3 |
| L.T.T. T. (G10,000)° F | −13 | −26 | −32 |
| L.T. Brittleness D-746 | −14 | −23 | −33 |
| Plasticizer Loss % | 4 | 2 | 2 |
| Heat Ageing Properties-70 Hrs./350° F | | | |
| Tensile, psi | 1175 | 1210 | 1250 |
| % Change | +3 | 3 | +3 |
| Elongation, % | 200 | 240 | 215 |
| % Change | 31 | 11 | 17 |
| 100% Mod. | 780 | 530 | 590 |
| 200% Mod. | 1175 | 1080 | 1160 |
| Duro A | 91 | 82 | 80 |
| Pts. Change | +19 | +17 | +11 |
| L.T.T. (G10,000)° F | +7 | −6 | −15 |
| L.T. Brittleness D-746 | +1 | −12 | −17 |
| Plasticizer Loss % | 8 | 6 | 4 |

TABLE XXIX

Plasticizers in Acrylate Rubber

| Formulation | B-1 | B-2 | B-3 |
|---|---|---|---|
| Original Properties | | | |
| Tensile, psi | 1570 | 1490 | 1530 |
| Elongation, % | 270 | 190 | 210 |
| 100% Mod. | 510 | 690 | 600 |
| 200% Mod. | 1250 | 1520 | 1480 |
| Duro A | 66 | 65 | 60 |
| L.T.T. (G10,000)° F | −28 | −26 | −32 |
| L.T. Brittleness D-746 | −33 | −31 | −36 |
| Compatibility | OK | OK | OK |
| Heat Ageing Properties-70 Hrs./300° F | | | |
| Tensile, psi | 1400 | 1275 | 1450 |
| % Change | 11 | 14 | 5 |
| Elongation % | 210 | 180 | 205 |
| % Change | 22 | 5 | 2 |
| 100% Mod. | 550 | 600 | 475 |
| 200% Mod. | 1270 | 1480 | 1400 |
| Duro A | 79 | 69 | 64 |
| Pts. Change | +13 | +4 | +4 |
| L.T.T. (G10,000)° F | −6 | −23 | −27 |
| L.T. Brittleness D-746 | −22 | −27 | −32 |
| Plasticizer Loss % | 5 | 2 | 2 |
| Heat Ageing Properties-70 Hrs./350° F | | | |
| Tensile, psi | 1500 | 1490 | 1420 |
| % Change | 4 | 0 | 7 |
| Elongation, % | 220 | 210 | 220 |
| % Change | 18 | +10 | +5 |
| 100% Mod. | 740 | 520 | 490 |
| 200% Mod. | 1350 | 1400 | 1210 |
| Duro A | 85 | 69 | 72 |
| Pts. Change | +19 | +4 | +12 |
| L.T.T. (G10,000)° F | +4 | −17 | −19 |
| L.T. Brittleness D-746 | +3 | −18 | −23 |
| Plasticizer Loss % | 5 | 3 | 3 |

EXAMPLE 20

Elastomer formulations were compounded in the proportions shown. The results obtained after cure and on heat ageing are shown in the following table.

| Formulation | 1 | 2 | 3 | 4 |
|---|---|---|---|---|
| CPE-CM0136 (Chlorinated Polyethylene Rubber Dow Chemical) | 100 | 100 | 100 | 100 |
| White Lead | 10 | 10 | 10 | 10 |
| Drapex 6.8 (Epoxidized Soybean Oil-Argus Chemical) | 10 | 10 | 10 | 10 |
| SRF Carbon Black | 60 | 60 | 60 | 60 |
| Triallyl Isocyanurate | 2 | 2 | 2 | 2 |
| Dicumyl Peroxide | 7.5 | 7.5 | 7.5 | 7.5 |
| Butoxyethoxyethanol Formal | — | 20 | — | — |
| Di-(Butoxyethoxyethanol)-Adipate | — | — | 20 | — |
| Di-(Butoxyethoxyethanol)-Mixed Esters-(Example 11) | — | — | — | 20 |
| Cure: 30 minutes at 320° F | | | | |

TABLE XXX

Plasticizers in Chlorinated Polyethylene Rubber

| Formulation | 1 | 2 | 3 | 4 |
|---|---|---|---|---|
| Orig. Properties | | | | |
| Tensile, psi | 3460 | 1640 | 2200 | 1800 |
| Elongation, % | 190 | 550 | 400 | 480 |
| 100% Mod. | 2000 | 260 | 350 | 300 |
| 200% Mod. | 3540 | 600 | 100 | 740 |
| Duro A | 85 | 69 | 70 | 69 |
| L.T.T. (G10,000)° F | −1 | −42 | −34 | −35 |
| L.T. Brittleness D-746 | −6 | −47 | −39 | −40 |
| Compatibility | — | OK | OK | OK |
| Heat Ageing Properties-70 hrs. at 212° F | | | | |
| Tensile, psi | 3350 | 1970 | 2225 | 1950 |
| % Change | −31 | +20 | +1 | +8 |
| Elongation, % | 160 | 490 | 380 | 490 |
| % Change | −15 | −10 | −5 | −2 |
| 100% Mod. | 2100 | 550 | 470 | 340 |
| 200% Mod. | — | 1150 | 1200 | 860 |
| Duro A | 87 | 83 | 75 | 73 |
| Pts. Change | +2 | +14 | +5 | +4 |
| L.T.T. (G10,000)° F | +3 | −9 | −28 | −30 |
| L.T. Brittleness D-746 | +8 | −14 | −33 | '35 |
| Plasticizer Loss % | — | 8 | 2 | 1 |
| Heat Ageing Properties-70 hrs. at 300°F | | | | |
| Tensile, psi | 1230 | 1160 | 1330 | 1330 |
| % Change | −64 | −29 | −39 | −26 |
| Elongation, % | 70 | 90 | 90 | 200 |
| % Change | −63 | −83 | −77 | −58 |
| 100% Mod. | — | 1275 | 1380 | 720 |
| 200% Mod. | — | — | — | 1330 |
| Duro A | 93 | 93 | 90 | 83 |
| Pts. Change | +8 | +24 | +20 | +14 |
| L.T.T. (G10,000)° F | +15 | +15 | +6 | −14 |
| L.T. Brittleness D-746 | +20 | +20 | +11 | −19 |
| Plasticizer Loss % | — | 10 | 9 | 7 |

The subject matter which applicants regard as their invention is particularly pointed out and claimed as follows:

1. A composition of matter of the formula:

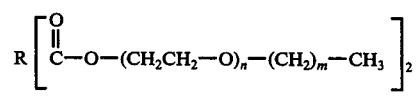

wherein R is —($CH_2$)$_3$, —($CH_2$)$_4$,

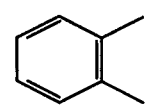

a mixture of —($CH_2$)$_3$ and —($CH_2$)$_4$—, or a mixture of —($CH_2$)$_2$, —($CH_2$)$_3$—, and —($CH_2$)$_4$—; and $n$ and $m$ are 3, or $n$ is 2 and $m$ is 5.

2. A composition of matter as described in claim 1 wherein R is —($CH_2$)$_3$—.

3. A composition of matter as described in claim 1 wherein R is —($CH_2$)$_4$—.

4. A composition of matter as described in claim 1 wherein R is

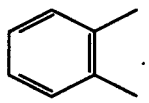

5. A composition of matter as described in claim 1 wherein R is a mixture of —(CH$_2$)$_3$—, and —(CH$_2$)$_4$—.

6. A composition of matter as described in claim 2 wherein n and m are 3.

7. A composition of matter as described in claim 4 wherein n and m are 3.

8. A composition of matter as described in claim 5 wherein n and m are 3.

9. A composition of matter as described in claim 2 wherein n is 2 and m is 5.

10. A composition of matter as described in claim 3 wherein n is 2 and m is 5.

11. A composition of matter as described in claim 4 wherein n is 2 and m is 5.

12. A composition of matter as described in claim 5 wherein n is 2 and m is 5.

13. A composition of matter as described in claim 1 wherein R is a mixture of —(CH$_2$)$_2$—, —(CH$_2$)$_3$—, and —(CH$_2$)$_4$—.

14. A composition of matter as described in claim 13 wherein n and m are 3.

15. A composition of matter as described in claim 13 wherein n is 2 and m is 5.

16. An elastomeric composition having solvent resistance, high temperature stability, and extended low temperature properties which comprises:

a. An effective amount of a composition of matter of the formula:

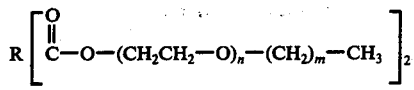

wherein R is —(CH$_2$)$_3$, —(CH$_2$)$_4$,

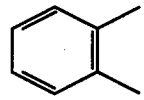

a mixture of —(CH$_2$)$_3$ and —(CH$_2$)$_4$—, or a mixture of —(CH$_2$)$_2$, —(CH$_2$)$_3$—, and —(CH$_2$)$_4$—; and n and m are 3, or n is 2 and m is 5; and b. a specialty rubber.

17. In a process for compounding an elastomeric composition containing a plasticizer having solvent resistance, high temperature stability and extended low temperature properties the improvement which comprises:

compounding a specialty rubber with a compound of the formula:

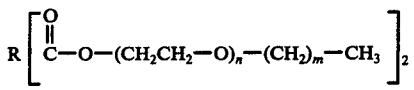

wherein R is —(CH$_2$)$_3$, —(CH$_2$)$_4$,

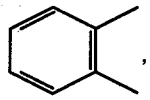

a mixture of —(CH$_2$)$_3$ and —(CH$_2$)$_4$—, or a mixture of —(CH$_2$)$_2$, —(CH$_2$)$_3$—, and —(CH$_2$)$_4$—; and n and m are 3, or n is 2 and m is 5 as the plasticizer.

* * * * *

UNITED STATES PATENT OFFICE
CERTIFICATE OF CORRECTION

Patent No. 4061612  Dated December 6, 1977

Inventor(s) Eugene R. Bertozzi, Robert F. Hoffman, and Robert Barclay

It is certified that error appears in the above-identified patent and that said Letters Patent are hereby corrected as shown below:

Column 2, line 13, delete "acis" and insert therefor -- acids --. Columns 9 and 10, Table II, the columns headed Di-(Hexyloxyethoxyethanol)-Adipate, the $G_{10,000}$ value at 212°F delete "-41°F" insert -- -45°F --, the $G_{10,000}$ value at 225°F, delete "-33°F" insert -- -41°F --, the $G_{10,000}$ value at 250°F, insert -- -33°F --; delete the column heading "Di-(Butoxxyethoxy-ethoxyetthanol)-Glutarate" insert -- Di-(Butoxyethoxyethoxy-ethanol)-Glutarate --. Column 11 and 12, Table IV, delete the column heading "Di-(Hexyloxyethoxyethanol ethanol)-Glutarate", insert -- Di-(Hexyloxyethoxyethanol)-Adipate -: delete the column heading "Di-(Butoxyethoxyethoxy-Example 6", insert -- Di-(Butoxyethoxyethoxyethanol)-Glutarate--; in the space following the column heading Di-(Butoxyethoxyethoxyethanol)-mixed ester from, insert -- Example 6 --; Table VI, the columns headed Control (No Plasticizer), the $G_{10,000}$ value at Original Properties, insert -- -4°F --, the $G_{10,000}$ value at 212°F, delete "-4°F "; the column headed Di-(Butoxyethoxyethanol)-Adipate, the Wt. % Loss at 212°F delete the illegible figure, insert -- 3 --, the Wt. % Loss at 225°F, delete the illegible figure, insert -- 3.6 --, the % Plast. Loss at 212°F, delete the illegible figure, insert -- 18% --, the % Plast. Loss at 225°F, delete the illegible figure, insert -- 20% --, the % Plast. Loss at 250°F, delete the illegible figure, insert -- 27% --. Column 13, Example 14, Formulation 2.Hycar 1051, for SRF #3 Carbon Black in the quantity column labelled Parts, delete "f60", insert -- 60 --. Columns 15 and 16, Table IX, the column headed Di-(Hexyloxyethoxyethanol)-Glutarate, the $G_{10,000}$(LTT) value at 212°F, delete "30°F", insert -- -30°F --, Table X, delete the column heading "Di-(Butoxyethoxyethanol)-Glutorate", insert -- Di-(Butoxyethoxyethanol)-Glutarate --. Columns 17 and 18, Table XIII, the column headed (Polymeric Plasticizer)(Union Camp) Uniflex 300, the $G_{10,000}$ value, delete "-180°F", insert --

UNITED STATES PATENT OFFICE
CERTIFICATE OF CORRECTION

Patent No. 4061612  Dated December 6, 1977

Inventor(s) Eugene R. Bertozzi, Robert F. Hoffman, and Robert Barclay

It is certified that error appears in the above-identified patent and that said Letters Patent are hereby corrected as shown below:

-18°F --. Columns 19 and 20, Table XV, the column headed Di-(Butoxyethoxyethanol)-Adipate, the Low Temp (PNT) value at 250°F, delete "37°F", insert -- -37°F --. Columns 23 and 24, Table XX, the % Perm. Set values, the column headed None, delete "3% 3%", insert -- 3% --, the column headed Di-(Butoxyethoxyethanol)-Adipate, delete, "5%", insert -- 3% --, the column headed B.T.P., delete "3%", insert -- 5% --, the column headed B.T.P. (Stabilized with antioxidant), delete "2%", insert -- 3% --, the column headed B.T.DBE-2, insert -- 2% --. Columns 25 and 26, Table XXI, delete the column heading "B.T.BDE-2", insert -- B.T.DBE-2. Column 34, Table XXX at about line 30, L.T. Brittleness D-746 column 4, delete "'35", insert -- -35 --.

Signed and Sealed this

Thirtieth Day of May 1978

[SEAL]

Attest:

RUTH C. MASON
Attesting Officer

LUTRELLE F. PARKER
Acting Commissioner of Patents and Trademarks